(12) United States Patent
Kagami et al.

(10) Patent No.: US 7,784,171 B2
(45) Date of Patent: Aug. 31, 2010

(54) METHOD OF MANUFACTURING A MAGNETO-RESISTIVE DEVICE

(75) Inventors: Takeo Kagami, Tokyo (JP); Tetsuya Kuwashima, Tokyo (JP); Norio Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/797,603

(22) Filed: May 4, 2007

(65) Prior Publication Data

US 2007/0206334 A1    Sep. 6, 2007

Related U.S. Application Data

(62) Division of application No. 10/747,162, filed on Dec. 30, 2003, now abandoned.

(30) Foreign Application Priority Data

Jan. 14, 2003   (JP) .................... 2003-006319
Dec. 12, 2003   (JP) .................... 2003-415810

(51) Int. Cl.
*G11B 5/127*   (2006.01)
*H04R 31/00*   (2006.01)

(52) U.S. Cl. .............. 29/603.16; 29/603.11; 29/603.13; 29/603.14; 29/603.15; 29/603.18; 216/22; 216/48; 360/324.1; 360/324.11; 360/324.12; 360/324.2; 427/127; 427/128

(58) Field of Classification Search .............. 29/603.11, 29/603.13–603.16, 603.18; 216/22, 48; 360/324.1, 360/324.11, 324.12, 324.2; 427/127–131
See application file for complete search history.

(56) References Cited

U.S. PATENT DOCUMENTS

| 6,353,318 | B1 | 3/2002 | Sin et al. | |
|---|---|---|---|---|
| 6,449,135 | B1 | 9/2002 | Ding et al. | |
| 6,473,257 | B1 | 10/2002 | Shimazawa et al. | |
| 6,542,342 | B1 | 4/2003 | Hayashi et al. | |
| 6,607,612 | B1 * | 8/2003 | Takahashi | 148/301 |
| 2002/0027753 | A1 | 3/2002 | Ishiwata et al. | |
| 2002/0030947 | A1 | 3/2002 | Chen et al. | |
| 2002/0159202 | A1 | 10/2002 | Yanagiuchi et al. | |
| 2003/0086216 | A1 | 5/2003 | Kagami et al. | |
| 2003/0151859 | A1 | 8/2003 | Hayashi et al. | |
| 2004/0042127 | A1 * | 3/2004 | Hoshiya et al. | 360/322 |

FOREIGN PATENT DOCUMENTS

| JP | A 2002-299726 | 10/2002 |
|---|---|---|
| JP | A 2003-086861 | 3/2003 |

OTHER PUBLICATIONS

United States Patent and Trademark Office Rejection, issued Dec. 10, 2009 in U.S. Appl. No. 12/232,785.

* cited by examiner

*Primary Examiner*—Paul D Kim
(74) *Attorney, Agent, or Firm*—Oliff & Berridge, PLC

(57) ABSTRACT

A method is provided for manufacturing a magneto-resistive device. The magneto-resistive device is for reducing the deterioration in the characteristics of the device due to annealing. The magneto-resistive device has a magneto-resistive layer formed on one surface side of a base, and an insulating layer formed of two layers and deposited around the magneto-resistive layer. The layer of the insulating layer closest to the base is made of a metal or semiconductor oxide. This layer extends over end faces of a plurality of layers made of different materials from one another, which make up the magneto-resistive device, and is in contact with the end faces of the plurality of layers with the same materials.

8 Claims, 15 Drawing Sheets

METHOD OF MANUFACTURING A MAGNETO-RESISTIVE DEVICE

This is a Division of application Ser. No. 10/747,162 filed Dec. 30, 2003, now abandoned. The disclosure of the prior application is hereby incorporated by reference herein in its entirety.

BACKGROUND OF THE INVENTION

The present invention relates to a magneto-resistive device and a method of manufacturing the same, and a magnetic head, a head suspension assembly and a magnetic disk apparatus which use the magneto-resistive device.

With the trend to a larger capacity and a smaller size of hard disk drives (HDD), heads are required to have a higher sensitivity and a larger output. To meet these requirements strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer films) is used for a magneto-resistive device.

Any type of CPP-based heads has an upper electrode and a lower electrode for supplying a current to a magneto-resistive layer formed on a base, formed on the top (opposite to the base) and on the bottom (close to the base) of the magneto-resistive layer, respectively. The CPP-based head comprises an insulating layer for limiting a current path between the upper electrode and lower electrode is arranged around a main layer (for example, a tunnel barrier layer in a TMR head) of the magneto-resistive layer. The limited current path substantially matches an effective region for detecting a magnetic field from a magnetic recording medium. A TMR head is disclosed as an example of the CPP-based head in JP-A-2001-23131 corresponding to U.S. Pat. No. 6,473,257 and JP-A-2001-52316 corresponding to U.S. patent application Publication No. 2003/0151859.

In a conventional general CPP-based head as disclosed in JP-A-2001-23131, an insulating layer for limiting a current path between an upper electrode and a lower electrode is formed of a single-layer film. This insulating layer is generally made of Al2O3 or SiO2.

Generally, for manufacturing a conventional CPP-based head as disclosed in JP-A-2001-23131, constituent layers formed on a substrate, which make up a magneto-resistive layer, are milled using a resist mask to pattern the constituent layers. Then, the resist mask is used as it is to form an insulating layer of Al2O3 or SiO2 around the constituent layers by a lift-off method.

On the other hand, in a conventional TMR head disclosed in JP-A-2001-52316, an insulating layer for limiting a current path between an upper electrode and a lower electrode is composed of a first insulating layer formed near an end face of a ferromagnetic tunnel junction film (corresponding to a magneto-resistive layer) having a tunnel barrier layer as well as a pinned layer and a free layer which sandwich the tunnel barrier layer, and a second insulating layer which surrounds the end face of the ferromagnetic tunnel junction film through the first insulating layer. The first insulating layer is made of oxides of metal materials which constitute the ferromagnetic tunnel junction film pattern formed within the ferromagnetic tunnel junction film pattern. In other words, the first insulating layer is a layer made of metal oxides produced by oxidizing the constituent layers themselves of the ferromagnetic tunnel junction film, used as base materials, respectively, and is not a layer disposed on the end face of the ferromagnetic tunnel junction film pattern from the outside of the ferromagnetic tunnel junction film pattern. Consequently, metal oxide films made of different materials from one another are in contact with the end faces of a plurality of layers made of different materials from one another, which make up the ferromagnetic tunnel junction film, and the first insulating layer is composed of a sequence of these metal oxide films made of different materials from one another. The second insulating layer is made of an Al oxide, a Si oxide, or the like.

For manufacturing the conventional TMR head disclosed in JP-A-2001-52316, (a) a ferromagnetic tunnel junction film pattern (constituent layers which make up a magneto-resistive layer) formed on a substrate is milled using a resist mask to pattern the constituent layers; (b) the end face portions of the constituent layers themselves, used as base materials, are naturally oxidized or oxidized by a plasma oxidation method or the like to produce the first insulating layer from the end faces themselves; and (c) the second insulating layer is formed around the constituent layers using the resist mask as it is by a lift-off method.

According to the conventional TMR head disclosed in JP-A-2001-52316, even if the milling causes milling re-deposits to stick near the ends of the constituent layers during the manufacturing, the milling re-deposits are oxidized and included in the first insulating layer which does not provide a bypass path for a sense current, advantageously preventing a reduction in the MR ratio, as described in JP-A-52316.

It should be understood that generally, magnetic heads have not only a reproducing device such as a TMR device, a GMR device and the like, but also a recording device such as an inductive magnetic transducing device and the like, so that a composite magnetic head is typically provided for reproducing and recording magnetic information. During manufacturing of such a composite magnetic head, generally, a reproducing device is formed on a substrate before a recording device is laminated thereon. Then, annealing is performed as a photoresist curing step when a coil is fabricated during the fabrication of the recording device. For example, JP-A-2001-52316 describes that for manufacturing a composite magnetic head which has a recording device laminated on a TMR device, annealing is performed for two hours at 250° C. as a photoresist curing step during the fabrication of a coil of the recording device.

The result of a research made by the inventors has revealed that the conventional magnetic heads as disclosed in JP-A-2001-23131 and JP-A-2001-52316 suffer from deteriorated characteristics of the TMR devices due to the annealing. In this regard, description will be made below.

The inventors fabricated a magnetic head similar to that disclosed in JP-A-2001-23131. The fabricated magnetic head had an inductive magnetic transducing device laminated on a TMR device as a recording device. Also, annealing was performed as a photoresist curing step during the fabrication of a coil of the recording device. Further, in the course of the fabrication of the magnetic head, the fabricated TMR device underwent the first measurement of the characteristics thereof (the resistance and MR ratio of the TMR device) before the creation of the recording device on the fabricated TMR device. Then, the TMR device again underwent the second measurement of the characteristic thereof (the resistance and MR ratio of THE TMR device) after the recording device had been created.

A comparison of the results of the first measurement with the results of the second measurement has revealed that the characteristics of the TMR device after the creation of the recording device were significantly deteriorated as compared with those before the creation of the recording device, contrary to an assumption that the characteristics of the TMR device would be the same before and after the creation of the recording device. Specifically, the resistance of the TMR device taken in the second measurement was higher than the resistance of the TMR device taken in the first measurement, while the MR ratio of the TMR device taken in the second measurement was lower than the MR ratio of the TMR device taken in the first measurement. The TMR device has a challenge of reducing the resistance of the device itself because noise proportionally increases as the resistance of the device is higher. Further, a higher MR ratio is desired because a reduced MR ratio causes a smaller head output.

The results of more detailed experiments made by the inventors have revealed that the aforementioned deterioration in the characteristics of the TMR device (increased resistance and reduced MR ratio) are caused by the annealing performed for fabricating the recording device.

Magneto-resistive devices such as the TMR device have a variety of applications such as a magnetic detector, MRAM (Magnetic Random Access Memory), and the like, other than magnetic heads, and the annealing is sometimes involved in these applications.

SUMMARY OF THE INVENTION

It is an object of the present invention to provide a magneto-resistive device which can reduce the deterioration in the device characteristics due to annealing, and a method of manufacturing the same, as well as a magnetic head, a head suspension assembly, and a magnetic disk apparatus which use the magneto-resistive device.

The result of a further research made by the inventors has revealed that the deterioration in the characteristics of the TMR device (increased resistance and reduced MR ratio) due to annealing appears to be caused under the influence of moisture, oxygen, hydrocarbons (HC), and the like adsorbed on the end face of the magneto-resistive device when it is exposed to the atmosphere after patterning thereof (or even if the magneto-resistive layer is not exposed to the atmosphere, moisture, oxygen, HC, and the like remaining as impurities in a vacuum chamber can adsorb on the end face of the magneto-resistive layer).

Based on the foregoing, the inventors thought it possible to reduce the deterioration in the characteristics of the magneto-resistive device due to the annealing by employing technical means set forth in respective aspects of the present invention as described below. The experiments described later have revealed that the technical means are actually effective.

A magneto-resistive device according to a first aspect of the present invention includes a magneto-resistive layer formed on one surface side of a base, and an insulating layer formed to be in contact with an effective region effectively involved in detection of magnetism in the magneto-resistive layer without overlapping with the effective region, wherein the insulating layer comprises two or more layers, the layer of the insulating layer closest to the base is made of a metal or semiconductor oxide, and the layer of the insulating layer closest to the base extends over end faces of a plurality of layers made of different materials from one another and making up the magneto-resistive layer, and is in contact with the end faces of the plurality of layers with the same materials.

When focusing attention only on the fact that the insulating layer may include two layers and that the layer of the insulating layer closest to the base may be made of a metal oxide in the magneto-resistive device according to the first aspect, the magneto-resistive device according to the first aspect is thought to apparently have a structure similar to the conventional TMR head disclosed in JP-A-2001-52316. This is because the layer of the insulating layer closest to the base in the first aspect corresponds to the first insulating layer in the conventional TMR head disclosed in JP-A-2001-52316, and the remaining layer of the insulating layer in the first aspect corresponds to the second insulating layer in the conventional TMR head disclosed in JP-A-2001-52316.

However, in the first aspect, the layer of the insulating layer closest to the base extends over the end faces of the plurality of layers made of different materials from one another and making up the magneto-resistive layer, and is in contact with the end faces of the plurality of layers with the same materials, so that the magneto-resistive device can be manufactured by a manufacturing method according to a fifth aspect of the present invention, later described. Specifically, after patterning one or more of the constituent layers making up the magneto-resistive layer, end portions of the constituent layers are not oxidized, but instead, an oxidizable layer is deposited in a region in which the one or more of the constituent layers have been removed by the patterning, and the deposited oxidizable layer can be oxidized to provide the layer of the insulating layer closest to the base. On the contrary, in the conventional TMR head disclosed in JP-A-2001-52316, as described above, the first insulating layer is formed within the constituent layers which make up the magneto-resistive layer (i.e., the first insulating layer is a layer produced by oxidizing end portions themselves of the constituent layers), and the first insulating layer is composed of a sequence of metal oxide films made of materials different from one another corresponding to respective materials, respectively, which make up the magneto-resistive layer. Thus, the conventional TMR head disclosed in JP-A-2001-52316 cannot be manufactured by the manufacturing method according to the fifth aspect of the present invention.

The result of a research made by the inventors, later described in detail, have revealed that the magneto-resistive device manufactured by the manufacturing method according to the fifth aspect of the present invention, later described, can reduce the deterioration in the characteristics (increased resistance and reduced MR ratio) of the magneto-resistive device due to annealing. Presumably, this is because when the oxidizable layer is deposited as a base material for oxidation, in addition to the constituent layers which make up the magneto-resistive layer, in a region in which the one or more of the constituent layers have been removed by the patterning after patterning the one or more of the constituent layers during the manufacturing, the influence exerted by adsorbates on the end face of the magneto-resistive layer is reduced by the nature (the nature of absorbing and trapping oxygen, and the like) of the oxidizable layer.

Thus, the magneto-resistive device according to the first aspect can be manufactured by the manufacturing method according to the fifth aspect of the present invention, later described, so that it can reduce the deterioration in the characteristics thereof (increased resistance and reduced MR ratio) due to annealing. On the contrary, the conventional TMR head disclosed in JP-A-2001-52316 cannot be manufactured by the manufacturing method according to the fifth aspect of the present invention, later described, so that it appears not to be able to reduce the deterioration in the characteristics thereof due to annealing.

In the first aspect, when the insulating layer includes two or more layers, all the layers may be made of the same material. Here, two or more layers made of the same material means that there is an interface existing between the respective layers. In the conventional TMR head disclosed in JP-A-2001-23131, the insulating layer formed around the constituent layers of the magneto-resistive layer is a single-layer, and accordingly does not have an interface in the laminating direction. Therefore, the conventional TMR head disclosed in JP-A-2001-23131 cannot either manufactured by the manufacturing method according to the fifth aspect of the present invention, later described, and accordingly cannot reduce the deterioration in the characteristics thereof due to annealing.

Since the layer of the insulating layer closest to the base is made of an oxide and has the insulating property, this layer will not provide a bypass path for a sense current, and therefore will not cause a reduction in the MR ratio due to the formation of a bypass path.

In a magneto-resistive device according to a second aspect of the present invention, the oxide is an oxide of a material selected from a group consisting of Al, Si, Ti, V, Cr, Mn, Fe, Ni, Co, Cu, Zn, Zr, Nb, Mo, Hf, Ta, and W in the first aspect.

The second aspect enumerates preferred examples of materials for the oxide for making the layer of the insulating layer closest to the base, but the oxide is not limited to these examples in the first aspect.

In a magneto-resistive device according to a third aspect of the present invention, the effective region is a region in which a current flows in a direction substantially perpendicular to the film surface in the magneto-resistive layer in the first or second aspect.

The magneto-resistive device according to the third aspect shows an example which employs a CPP structure. Since the CPP structure requires an insulating layer for limiting a current path between the upper electrode and lower electrode, a large technical meaning lies in the reduced deterioration in the characteristics due to annealing.

In a magneto-resistive device according to a fourth aspect of the present invention, the magneto-resistive layer includes a tunnel barrier layer formed on one surface side of a free layer, a pinned layer formed on one surface side of the tunnel barrier layer opposite to the free layer, and a pin layer formed on one surface side of the pinned layer opposite to the tunnel barrier layer, in the third aspect.

While the fourth aspect shows an example in which the third aspect is applied to a TMR device, the third aspect is not limited to the TMR device but may be applied as well to a CPP-GMR device and the like.

A method of manufacturing a magneto-resistive device according to a fifth aspect of the present invention includes the steps of depositing constituent layers making up a magneto-resistive layer on a base, patterning one or more layers of the constituent layers, depositing an oxidizable layer in a region in which the one or more layers of the constituent layers have been removed by the patterning, oxidizing the oxidizable layer, and depositing an insulating layer on the oxidizable layer.

The manufacturing method according to the fifth aspect can manufacture the magneto-resistive device which can reduce the deterioration in the characteristics thereof (increased resistance and reduced MR ratio) due to annealing.

While the oxidizable layer is generally made of a metal or a semiconductor and has the electric conductivity, the manufacturing method according to the fifth aspect includes the step of oxidizing the oxidizable layer, so that even if the oxidizable layer eventually remains, the oxidizable layer merely remains as an oxide layer. Therefore, even if the oxidizable layer eventually remains, this layer will not provide a bypass path for a sense current, and therefore will not cause a reduction in the MR ratio due to the formation of a bypass path.

In the manufacturing method according to the fifth aspect, the base may be or may not be placed in the atmosphere after the step of patterning and before the step of depositing the oxidizable layer. When the base is placed in the atmosphere, moisture, oxygen molecules, and the like will adsorb on end faces of remaining portions of the constituent layers after they have been patterned. However, since the oxygen is thought to be absorbed and trapped by the oxidizable layer after the deposition of the oxidizable layer, it is possible to reduce the deterioration in the characteristics of the magneto-resistive device due to annealing. However, it is preferred not to place the base in the atmosphere after the step of patterning and before the step of depositing the oxidizable layer. The foregoing discussion is also applied to a sixteenth aspect and the like, later described.

Also, in the manufacturing method according to the fifth aspect, dry etching may or may not be performed for cleaning the surface immediately before the step of depositing the oxidizable layer. Even without the dry etching performed to reduce moisture, oxygen molecules, and the like in the atmosphere, adsorbed on the end faces of the remaining portions of the constituent layers after they have been patterned, the oxygen is thought to be absorbed and trapped by the oxidizable layer after the deposition of the oxidizable layer. It is therefore possible to reduce the deterioration in the characteristics of the magneto-resistive device due to annealing even without necessarily performing the dry etching. However, the dry etching is preferably performed for cleaning the surface immediately before the step of depositing the oxidizable layer. The foregoing discussion is applied as well to the sixteenth aspect and the like, later described.

In a method of manufacturing a magneto-resistive device according to a sixth aspect of the present invention, the step of oxidizing includes, in the fifth or sixth aspect, the step of placing the base in the atmosphere to naturally oxidize the oxidizable layer in the fifth aspect.

The natural oxidization as in the sixth aspect is preferably utilized because the manufacturing process is simplified. Alternatively, the step of oxidizing may include forced oxidization such as plasma oxidization, radical oxidization, ion beam oxidization, exposure to ozone, or the like. When the forced oxidization is involved, the base may be or may not be placed in the atmosphere after the step of depositing the oxidizable layer and before the step of depositing the insulating layer. Also, in the fifth aspect, the step of oxidizing is not limited to the natural oxidization or forced oxidization, but may be a step of oxidizing the oxidizable layer through absorption of oxygen from other layers by the action of annealing.

A method of manufacturing a magneto-resistive device according to a seventh aspect of the present invention further includes the step of performing dry etching for cleaning the surface immediately before the step of depositing the insulating layer.

While the dry etching as in the seventh aspect is preferable for removing impurities and the like, this dry etching is not necessarily performed in the fifth or sixth aspect.

In a method of manufacturing a magneto-resistive device according to an eighth aspect of the present invention, the step of performing dry etching includes the step of performing the dry etching in the same vacuum chamber in which the step of depositing the insulating layer is performed in the seventh aspect.

When dry etching is performed for cleaning the surface immediately before the step of depositing the insulating layer, the dry etching can be readily performed in the same vacuum chamber in which the step of depositing the insulating layer is performed, as in the eighth aspect. Examples of dry etching for use in this event may be sputter etching and ion beam etching.

In a method of manufacturing a magneto-resistive device according to a ninth aspect of the present invention, the oxidizable layer substantially remains after the step of performing dry etching and after the step of depositing the insulating layer in the seventh or eighth aspect.

In a method of manufacturing a magneto-resistive device according to according to a tenth aspect of the present invention, the oxidizable layer is substantially removed by the step of performing dry etching in the seventh or eighth aspect.

It has been confirmed by an experiment, later described, that the deterioration in the characteristics of the magneto-resistive device due to annealing can be reduced irrespective of whether the oxidizable layer remains or not after the dry etching as in the ninth and tenth aspects.

A method of manufacturing a magneto-resistive device according to an eleventh aspect of the present invention further includes, in the fifth or sixth aspect, the step of removing the oxidizing layer before the step of depositing the insulating layer.

As mentioned above, It has been confirmed by an experiment, later described, that the deterioration in the characteristics of the magneto-resistive device due to annealing can be reduced even if the oxidizable layer does not eventually remain. Therefore, the manufacturing method according to the eleventh aspect can also contribute to reducing the deterioration in the characteristics of the magneto-resistive device due to annealing.

While the dry etching in the tenth aspect also serves as the step of removing in the eleventh aspect, the step of removing in the eleventh aspect is not limited to the dry etching for cleaning the surface.

A method of manufacturing a magneto-resistive device according to a twelfth aspect of the present invention includes the steps of depositing constituent layers making up a magneto-resistive layer on a base, patterning one or more layers of the constituent layers, depositing a layer formed of a single-layer film, or a composite-layer film made of a metal and/or a semiconductor in a region in which the one or more layers of the constituent layers have been removed by the patterning, removing the layer formed of a single-layer film or a composite-layer film made of a metal and/or a semiconductor, and depositing an insulating layer in the region in which the one or more layers of the constituent layers have been removed by the patterning after the step of removing the layer. In this disclosure, "metal and/or semiconductor" means "one or both of metal and semiconductor."

In the manufacturing method according to the twelfth aspect, when an oxidizable layer is used for the layer formed of a single-layer film or a composite-layer film made of a metal and/or a semiconductor as in the sixth aspect described later, the oxidizable layer need not be eventually left as mentioned above, so that it is possible to reduce the deterioration in the characteristics of the magneto-resistive device due to annealing, in a manner similar to the fifth aspect.

On the other hand, in the manufacturing method according to the twelfth aspect, when a substantially oxidization-free layer is used for the layer formed of a single-layer film or a composite-film made of a metal and/or a semiconductor, it is thought that this layer does not have the nature of absorbing and trapping oxygen, so that the resulting magneto-resistive device cannot reduce the deterioration in the characteristics thereof due to annealing by the same principle as the manufacturing method according to the fifth aspect. However, this layer does have a barrier-like nature to oxygen and the like. Therefore, according to the twelfth aspect, when a substantially oxidization-free layer is used for the layer formed of a single-layer film or a composite-film made of a metal and/or a semiconductor, the layer formed of a single-layer film or a composite-film made of a metal and/or a semiconductor is deposited after the step of patterning and before the base is placed in the atmosphere, such that even if the base is placed in the atmosphere before the insulating layer is deposited, the end faces of the portions of the constituent layers, which remain after the patterning, are protected by the barrier-like nature of the layer formed of a single-layer film or a composite-film made of a metal and/or a semiconductor. Consequently, according to the manufacturing method in the twelfth aspect, even if a substantially oxidization-free layer is used for the layer formed of a single-layer film or a composite-layer film made of a metal and/or a semiconductor, the resulting magneto-resistive device can reduce the deterioration in the characteristics thereof due to annealing.

Since the manufacturing method according to the twelfth aspect includes the step of removing, the layer formed of a single-layer film or a composite-layer film made of a metal and/or a semiconductor does not eventually remain, so that even if the layer does not have a sufficient insulating property, the layer will not provide a bypass path for a sense current. For this reason, the manufacturing method according to the twelfth aspect does not necessarily require the step of oxidizing the oxidizable layer, which is a constituent step of the manufacturing method according to the fifth aspect, not only when a substantially oxidization-free layer is used for the layer formed of a single-layer film or a composite-layer film made of a metal and/or a semiconductor but also when an oxidizable layer is used for the layer formed of a single-layer film or a composite-layer film made of a metal and/or a semiconductor.

In the twelfth aspect, the base may or may not be placed in the atmosphere after the step of depositing the layer formed of a single-layer film or a composite-layer film made of a metal and/or a semiconductor and before the step of depositing the insulating layer.

A method of manufacturing a magneto-resistive device according to thirteenth aspect of the present invention further includes, in the twelfth aspect, the step of performing dry etching for cleaning the surface immediately before the step of depositing the insulating layer, wherein the step of performing dry etching additionally serves as the step of removing.

It is preferable that the dry etching for cleaning the surface additionally serves as the step of removing as in the thirteenth aspect, because the process can be simplified as compared with both steps are performed in separation.

In a method of manufacturing a magneto-resistive device according to a fourteenth aspect of the present invention, the step of performing dry etching includes the step of performing the dry etching in the same vacuum chamber in which the step of depositing the insulating layer is performed in the thirteenth aspect.

The dry etching is preferably performed in the same vacuum chamber as in the fourteenth aspect, because the dry etching for cleaning the surface can be readily performed. Examples of dry etching for use in this event may be sputter etching and ion beam etching.

In a method of manufacturing a magneto-resistive device according to a fifteenth aspect of the present invention, the layer formed of a single-layer film or a composite-layer film made of a metal and/or a semiconductor is formed of a single-layer film or a composite-layer film made of one or more materials selected from a group consisting of Al, Si, Ti, V, Cr, Mn, Fe, Ni, Co, Cu, Zn, Zr, Nb, Mo, Hf, Ta, W, Ru, Rh, Pd, Ag, Re, Os, Ir, Pt, and Au, in any of the twelfth to fourteenth aspects.

The fifteenth aspect enumerates preferred examples of materials for the layer formed of a single-layer film or a composite-layer film made of a metal and/or a semiconductor, but the material is not limited to these examples in the twelfth to fourteenth aspects. In the materials listed above, Ru, Rh, Pd, Ag, Re, Os, Ir, Pt, and Au are examples of substantially oxidization-free materials.

In a method of manufacturing a magneto-resistive device according to a sixteenth aspect of the present invention, the layer formed of a single-layer film or a composite-layer film made of a metal and/or a semiconductor is an oxidizable layer, in any of the twelfth to fourteenth aspects.

In the manufacturing method according to the sixteenth aspect, since an oxidizable layer is used for the layer formed of a single-layer film or a composite-layer film made of a metal and/or a semiconductor, the nature of the oxidizing layer to absorb and trap oxygen can be utilized to further reduce the deterioration in the characteristics of the magneto-resistive device due to annealing. However, in the twelfth to fourteenth aspects, a substantially oxidization-free layer may be used for the layer formed of a single-layer film or a composite-layer film made of a metal and/or a semiconductor, as described above.

In a method of manufacturing a magneto-resistive device according to a seventeenth aspect of the present invention, the oxidizable layer is formed of a single-layer film or a composite-layer film made of one or more materials selected from a group consisting of Al, Si, Ti, V, Cr, Mn, Fe, Ni, Co, Cu, Zn, Zr, Nb, Mo, Hf, Ta, and W, in any of the fifth to eleventh and sixteenth aspects.

The seventeenth aspect enumerates preferred examples of materials for the oxidizable layer, but the material is not limited to these examples in the fifth to eleventh and sixteenth aspects.

In a method of manufacturing a magneto-resistive device according to an eighteenth aspect, the magneto-resistive device includes an effective region effectively involved in detection of magnetism in the magneto-resistive layer, wherein the effective region is a region in which a current flows in a direction substantially perpendicular to the film surface in the magneto-resistive layer, in any of the fifth to seventeenth aspects.

The magneto-resistive device according to the eighteenth aspect shows an example which employs a CPP structure. Since the CPP structure requires an insulating layer for limiting a current path between the upper electrode and lower electrode, a large technical meaning lies in the reduced deterioration in the characteristics due to annealing.

In a method of manufacturing a magneto-resistive device according to a nineteenth aspect, the magneto-resistive layer includes a tunnel barrier layer formed on one surface side of a free layer, a pinned layer formed on one surface side of the tunnel barrier layer opposite to the free layer, and a pin layer formed on one surface side of the pinned layer opposite to the tunnel barrier layer, in any of the fifth to eighteenth aspects.

While the nineteenth aspect shows an example in which the eighteenth aspect is applied to a TMR device, the eighteenth aspect is not limited to the TMR device but may be applied as well to a CPP-GMR device and the like.

A magnetic head according to a twentieth aspect of the present invention includes a base, and a magneto-resistive device supported by the base, wherein the magneto-resistive device is the magneto-resistive device according to any of the first to fourth aspects or the magneto-resistive device manufactured by the manufacturing method according to any of the fifth to nineteenth aspects.

According to the twentieth aspect, since the magnetic head uses the magneto-resistive device according to any of the first to fourth aspects or the magneto-resistive device manufactured by the manufacturing method according to any of the fifth to nineteenth aspects, the magnetic head can reduce the deterioration in the characteristics of the magneto-resistive device due to annealing. Therefore, for example, when the magneto-resistive device is combined with another recording device to provide a composite magnetic head, it is possible to improve the characteristics of the magneto-resistive device, even if the device is annealed in the course of the manufacturing of the recording device, to achieve an increased S/N ratio of a read signal, and the like.

A head suspension assembly according to a twenty first aspect of the present invention includes a magnetic head, and a suspension for supporting the magnetic head mounted near a leading end thereof, wherein the magnetic head is the magnetic head according to the twentieth aspect.

According to the twenty first aspect, since the head suspension assembly employs the magnetic head according to the twentieth aspect, the recording density can be increased for a magnetic disk apparatus or the like.

A magnetic disk apparatus according to a twenty second aspect of the present invention includes the head suspension assembly according to the twenty first aspect, an arm for supporting the head suspension assembly, and an actuator for moving the arm to position a magnetic head.

According to the twenty second aspect, since the magnetic disk apparatus employs the head suspension assembly according to the twenty first aspect, the recording density can be increased.

DETAILED DESCRIPTION OF THE EMBODIMENTS

In the following, a magneto-resistive device and a method of manufacturing the same, and a magnetic head, a head suspension assembly and a magnetic disk apparatus which use the magneto-resistive device according to the present invention will be described with reference to the accompanying drawings.

First, a magnetic head according to a first embodiment of the present invention will be described with reference to FIGS. 1 to 5.

Figure 1:
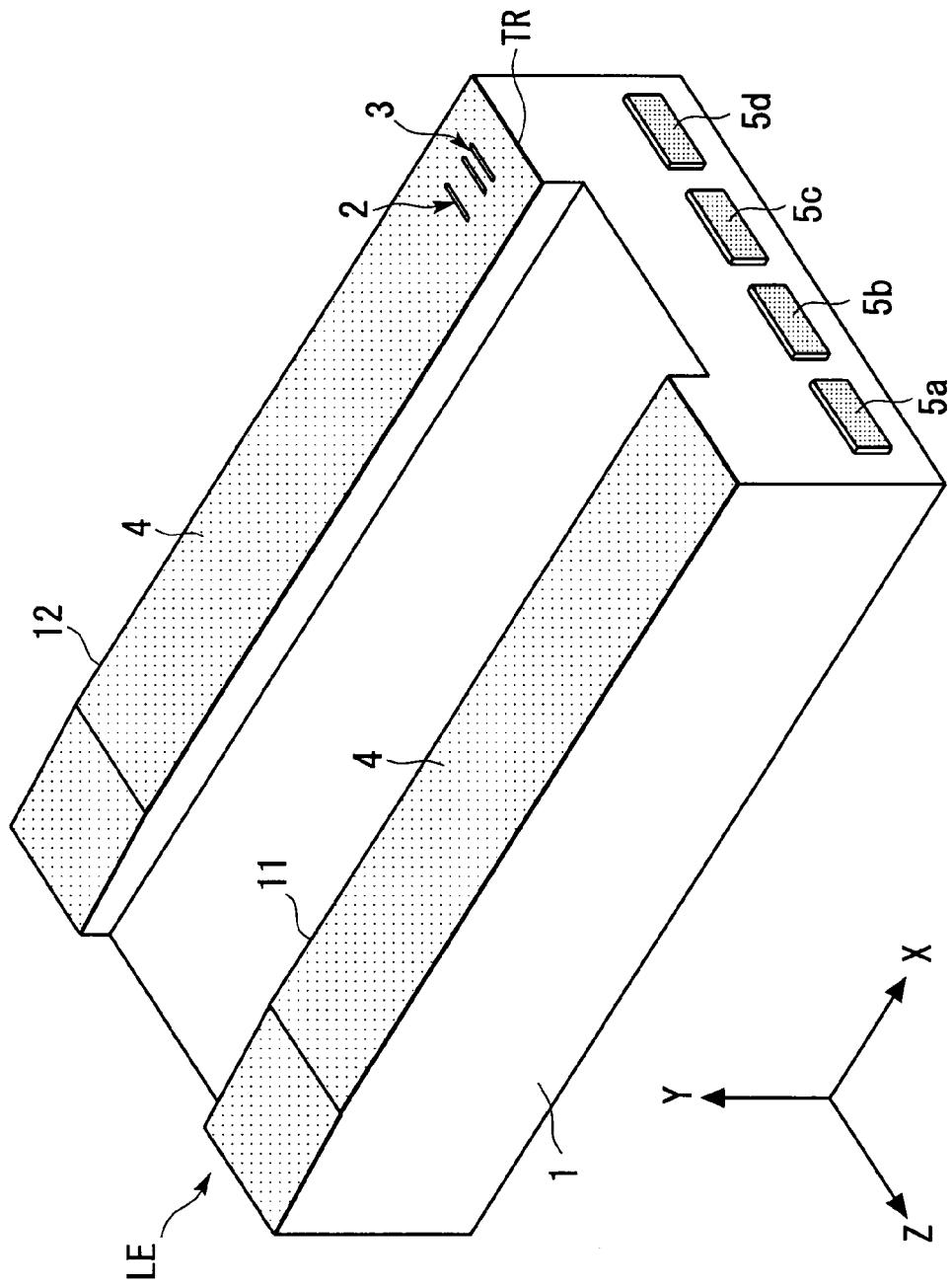
FIG. 1 is a general perspective view schematically illustrating a magnetic head according to a first embodiment of the present invention.
Figure 2:
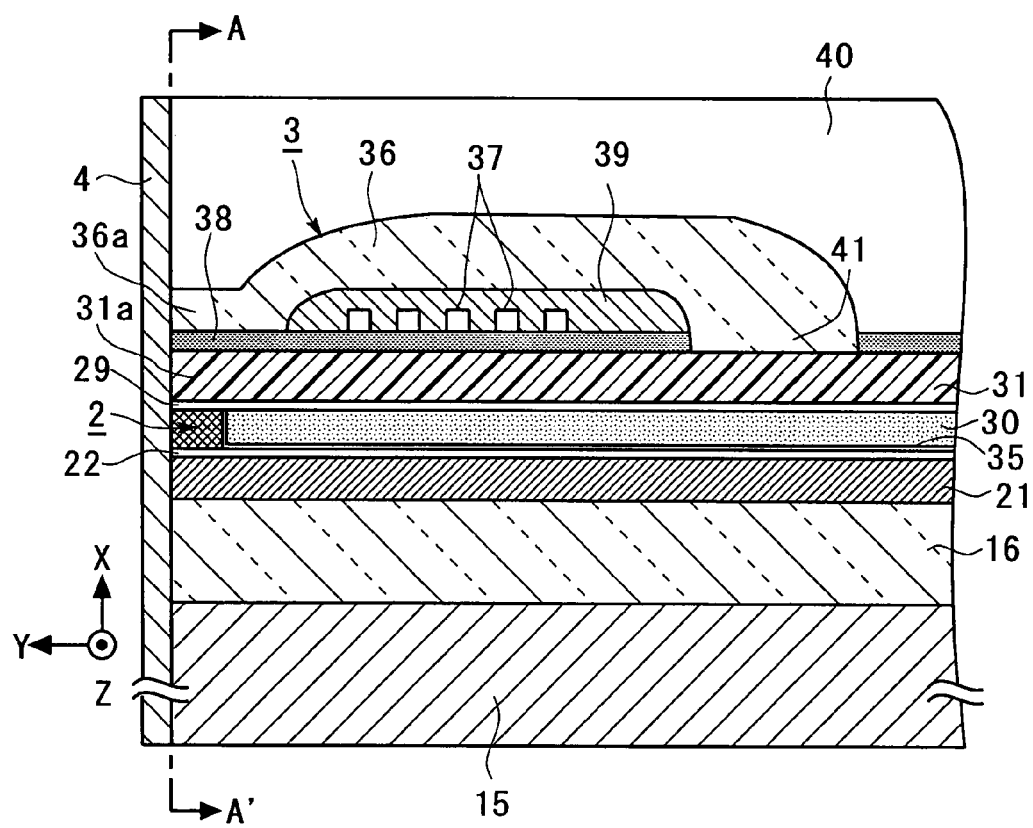
FIG. 2 is an enlarged cross-sectional view schematically illustrating a portion of a TMR device and an inductive magnetic transducing device in the magnetic head illustrated in FIG. 1.
Figure 3:
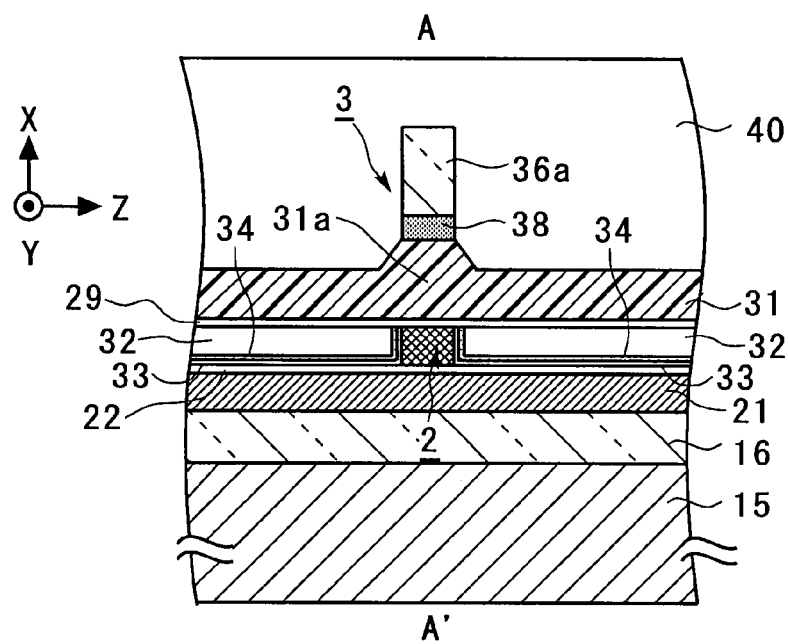
FIG. 3 is a general sectional view taken along a line A-A' indicated by arrows in FIG. 2.
Figure 4:
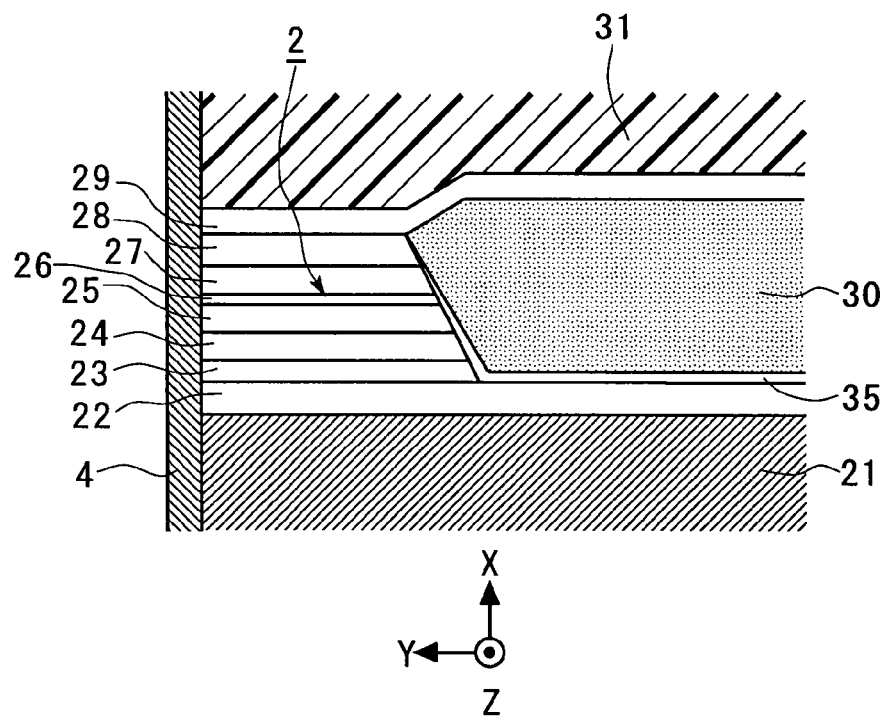
FIG. 4 is a further enlarged view around the TMR device in FIG. 2.
Figure 5:
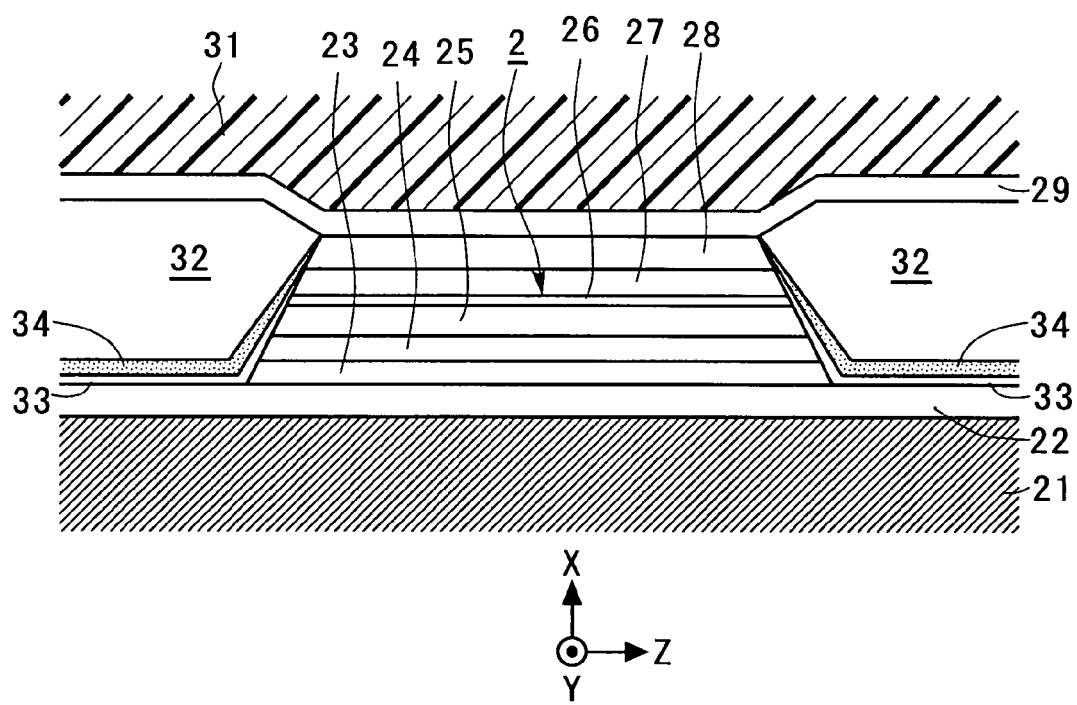
FIG. 5 is a further enlarged view around the TMR device in FIG. 3.

FIG. 1 is a general perspective view schematically illustrating the magnetic head according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A-A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIG. 1 to 5 (the same applies to figures later described). The Z-axis direction indicated by the arrow is referred to as the "+Z-direction" or "+Z-side," and the opposite direction is referred to as the "−Z-direction" or "−Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head according to the first embodiment comprises a slider 1 as a base; the TMR device 2 as a magneto-resistive device for use as a magnetic head device for reproduction; an inductive magnetic transducing device 3 as a magnetic head device for recording; and a protection film 4 made of a DLC film or the like, and is configured as a composite magnetic head. However, the magnetic head according to the present invention may comprise only the TMR device 2. Also, while the magnetic head of the first embodiment comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In the first embodiment, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC (Al2O3-TiC), SiC or the like. When Al2O3-TiC is used, an insulating film made, for example, of $Al_2O_3$ is used for the underlying layer 16 since Al2O3-TiC is electrically conductive. The underlying layer 16 may not be provided in some cases.

As illustrated in FIGS. 4 and 5, the TMR device 2 comprises a lower electrode 21 formed on the underlying layer 16; an upper electrode 31 formed overlying the lower electrode 21 (opposite to the base 15); and a lower metal layer (lower layer) 22, a lower metal layer (upper layer) 23, a pin layer 24, a pinned layer 25, a tunnel barrier layer 26, a free layer 27, and an upper metal layer (cap layer) 28 as a non-magnetic metal layer which serves as a protection layer, and an upper metal layer 29 as an underlying layer of the upper electrode 31 which are laminated in this order from the lower electrode 21 between the electrodes 21, 31. The pin layer 24, pinned layer 25, tunnel barrier layer 26 and free layer 27 constitute a magneto-resistive layer. While the actual TMR device 2 typically has a laminate structure compose of a larger number of layers, rather than the laminate structure composed of the number of layers as illustrated, the illustrated magnetic head represents a laminate structure minimally required for the basic operation of the TMR device 2 for simplifying the description.

In the first embodiment, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is comprised, for example, of a Ta layer or the like. The lower metal layer 23 is an electrically conductive material which is comprised, for example, of an NiFe layer or the like. In the first embodiment. The lower metal layer 23 is formed only coextensively to the magneto-resistive layer, while the lower metal layer 22 widely extends over the electrode 21. Alternatively, the lower metal layer 23 may also be extended widely, or the lower metal layer 22 may be formed only coextensively to the magneto-resistive layer.

The pin layer 24, which is comprised of an antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, CoZrNb, FeCoNi, or the like. The pinned layer 25 has its magnetization direction fixed in a predetermined direction by an exchange bias magnetic field between the pinned layer 25 and the pin layer 24. On the other hand, the free layer 27 freely varies its magnetization direction in response to an external magnetic field which is basically magnetic information. The pinned layer 25 and free layer 27 are not limited to single-layers, but may implemented, for example, by a laminate comprised of a combination of a pair of magnetic layers in anti-ferromagnetic coupling and a non-magnetic metal layer sandwiched therebetween. Such a laminate may be formed, for example, of three ferromagnetic layers made of CoFe/Ru/CoFe. In the first embodiment, the pin layer 24, pinned layer 25, tunnel barrier layer 26 and free layer 27 are laminated in this order from the lower electrode 21. Alternatively, the free layer 27, tunnel barrier layer 26, pinned layer 25 and pin layer 24 may be laminated in this order from the lower electrode 21. The tunnel barrier layer 26 is formed, for example, of a material such as Al2O3, NiO, GdO, MgO, Ta2O5, MoO2, TiO2, WO2, or the like.

The upper metal layer 28 is formed of a single-layer film or a composite-layer film made of simple Ta, Rh, Ru, Os, W, Pd, Pt, or Au, or an alloy made up of two or more of these elements in combination.

The upper metal layer 29, serving as the underlying layer of the upper electrode 31, is made of an electrically conductive material formed of a non-magnetic metal such as Ta or the like. In the first embodiment, the upper metal layer 29 is provided for holding a magnetic shield gap (a gap between the electrodes 21, 31) of a desired dimension. However, the upper metal layer 29 may not be provided.

As illustrated in FIGS. 3 and 5, a magnetic domain control layer 32 for applying a biasing magnetic field to the free layer 27 for magnetic domain control is formed on each side of the magneto-resistive layer in the Z-axis direction. The magnetic domain control layer 32 is formed, for example, of a hard magnetic material such as Cr/CoPt (cobalt platinum alloy), Cr/CoCrPt (cobalt chromium platinum alloy), TiW/CoPt, TiW/CoCrPt, or the like. Alternatively, the magnetic domain control layer 32 may be, for example, a layer using a switched connection in which a soft magnetic layer and an anti-ferromagnetic layer are laminated. Two insulating layers 33, 34 are formed under the magnetic domain control layer 32. The insulating layers 33, 34 also intervene between end faces of the magnetic domain control layer 32 and layers 23-28 on the +Z-side and -Z-side, such that the layers 23-28 are not electrically short-circuited by the magnetic domain control layer 32. The upper insulating layer 34 is made of Al2O3 or SiO2.

In the first embodiment, the insulating layer 33, closest to the base 15 of the two insulating layers 33, 34, is formed of a single-layer film made of a metal or semiconductor oxide, and extends over the end faces of the layers 23-28 such that it is in contact with the end faces of the layers 23-28 with the same materials. The layers 23-28 are made of the aforementioned materials, respectively, different from one another. However, some of layers 23-28 are made of the same materials. Specifically, the insulating layer 33 may be made, for example, of an oxide of Al, Si, Ti, V, Cr, Mn, Fe, Ni, Co, Cu, Zn, Zr, Nb, Mo, Hf, Ta, or W. While the insulating layers 33, 34 may be made of the same materials, an interface also exists between the two layers in that case.

Also, as illustrated in FIGS. 2 and 4, two insulating layers 30, 35 are formed between the lower metal layer 22 and upper metal layer 29 in a region in which the layers 32-34 are not formed. The two insulating layers 30, 35 cover the end faces of the layers 23-28 on the −Y-side. The upper insulating layer 30 is made of Al2O3 or SiO2.

In the first embodiment, the insulating layer 35, closest to the base 15 of the two insulating layers 30, 35, is formed of a single-layer film made of a metal or semiconductor oxide, similar to the insulating layer 33, and extends over the end faces of the layers 23-28 such that it is in contact with the end faces of the layers 23-28 with the same materials. Specifically, the insulating layer 35 may be made, for example, of an oxide of Al, Si, Ti, V, Cr, Mn, Fe, Ni, Co, Cu, Zn, Zr, Nb, Mo, Hf, Ta, or W. While the insulating layers 30, 35 may be made of the same materials, an interface also exists between the two layers in that case.

In the first embodiment, the two insulating layers 33, 34 on the +Z-side and −Z-side of the magneto-resistive layer, as well as the two insulating layers 35, 30 on the −Y-side of the magneto-resistive layer comprise an insulating layer which is formed to be in contact with an effective region effectively involved in the detection of magnetism in the magneto-resistive layer (in the first embodiment, a region in which a current flows in a direction substantially perpendicular to the film surface in the magneto-resistive layer), without overlapping with this effective region.

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of a thermosetting photoresist (for example, an organic resin such as a novolac resin); a protection layer 40 made of alumina or the like, and the like. NiFe, FeN or the like, for example, is used as a material for the upper magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper electrode 31 may be divided into two layers across an insulating layer made of Al2O3, SiO2 or the like in order to separate the role of the lower magnetic layer in the inductive magnetic transducing device 3 from the role of the upper electrode in the TMR device 2.

Next, description will be made on a method of manufacturing a magnetic head according to a second embodiment of the present invention. This magnetic head manufacturing method is provided for manufacturing the magnetic head according to the first embodiment, and includes a method of manufacturing a magneto-resistive device according to one embodiment of the present invention.

First, a wafer process is performed. Specifically, a wafer 101 made of Al2O3-TiC, SiC or the like is provided for making a base 15. Using the thin film forming technology and the like, the aforementioned layers are formed in a large number of magnetic head forming regions in matrix on the wafer 101 to provide the aforementioned structure.

Figure 7A:
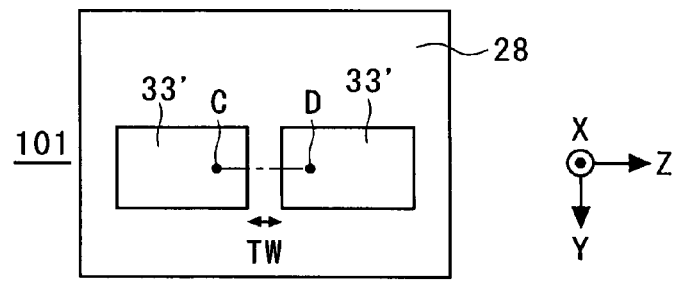
FIGS. 7A and 7B are diagrams schematically illustrating a further step which makes up the magnetic head manufacturing method according to the second embodiment of the present invention.
Figure 7B:
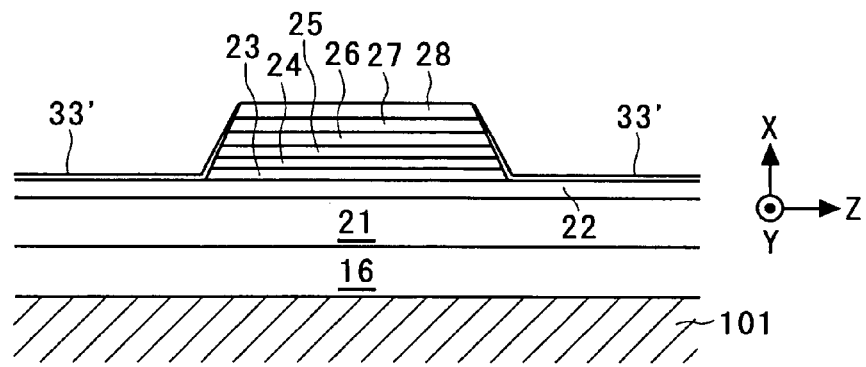
Figure 8A:
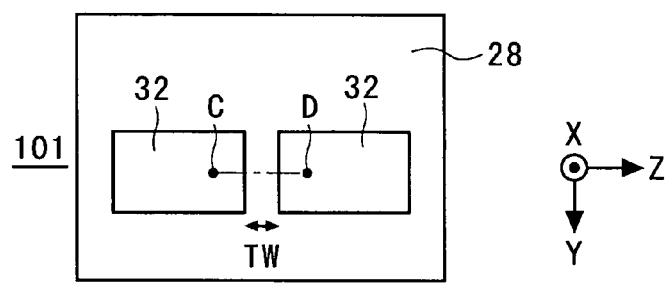
FIGS. 8A and 8B are diagrams schematically illustrating a further step which makes up the magnetic head manufacturing method according to the second embodiment of the present invention.
Figure 8B:
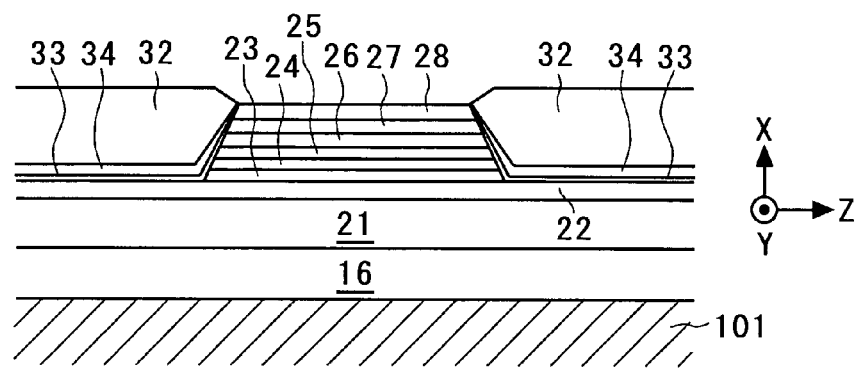
Figure 9A:
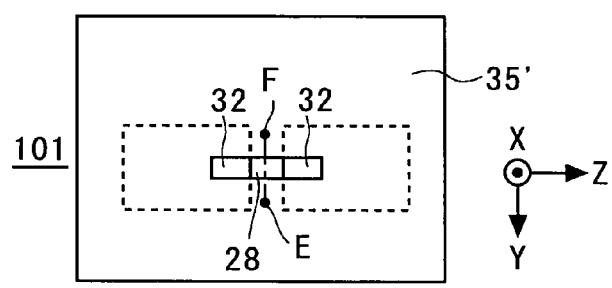
FIGS. 9A and 9B are diagrams schematically illustrating a further step which makes up the magnetic head manufacturing method according to the second embodiment of the present invention.
Figure 9B:
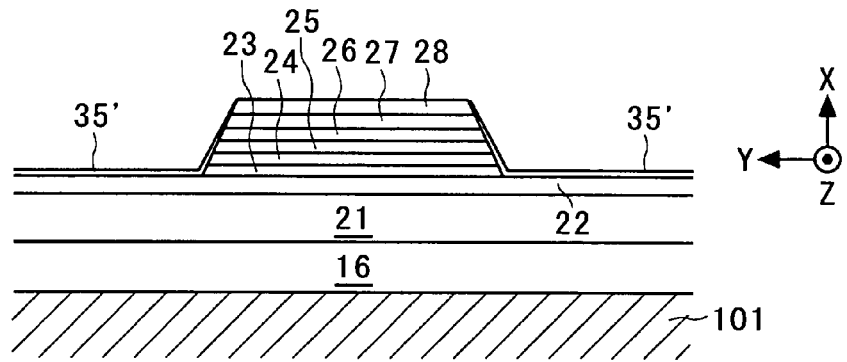
Figure 10A:
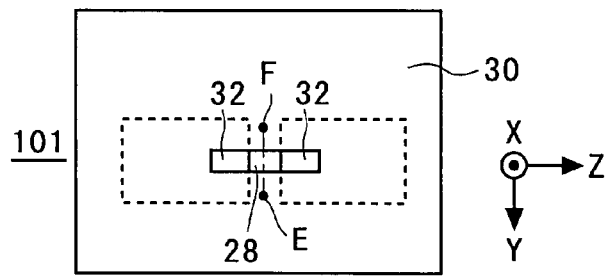
FIGS. 10A and 10B are diagrams schematically illustrating a further step which makes up the magnetic head manufacturing method according to the second embodiment of the present invention.
Figure 10B:
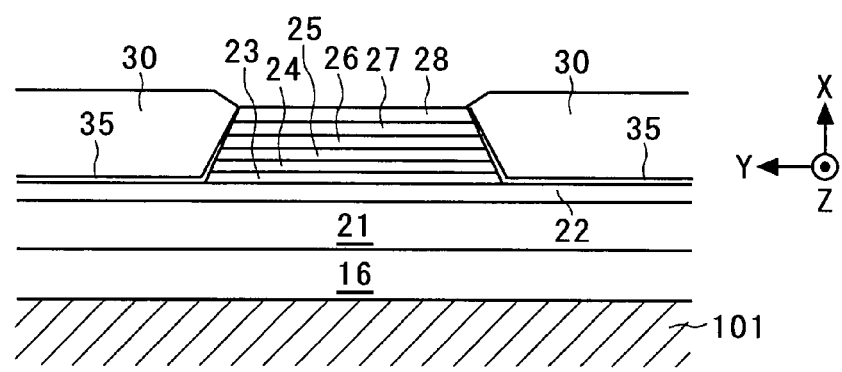

The outline of the wafer process will be described with reference to FIGS. 6 to 11. FIGS. 6 to 11 are diagrams schematically illustrating respective steps which make up the wafer process, wherein FIGS. 6A, 7A, 8A, 9A, 10A and 11A are general plan views, respectively; FIG. 6B is a general cross-sectional view taken along a line C-D in FIG. 6A; FIG. 7B is a general cross-sectional view taken along a line C-D in FIG. 7A; FIG. 8B is a general cross-sectional view taken along a line C-D in FIG. 8A; FIG. 9B is a general cross-sectional view taken along a line E-F in FIG. 9A; FIG. 10B is a general cross-sectional view taken along a line E-F in FIG. 10A; and FIG. 11B is a general cross-sectional view taken along a line E-F in FIG. 11A. In FIGS. 7A and 8A, TW indicates the width of a track defined by the TMR device 2.

Figure 6A:
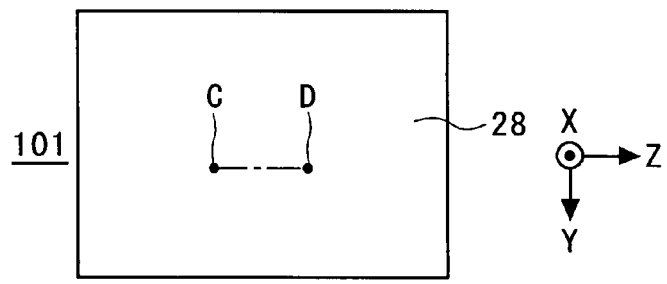
FIGS. 6A and 6B are diagrams schematically illustrating a step which makes up a magnetic head manufacturing method according to a second embodiment of the present invention.
Figure 6B:
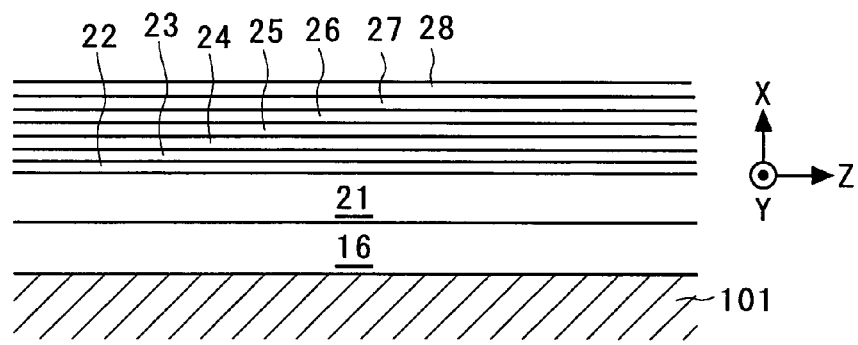

First, in the wafer process, the underlying layer 16, lower electrode 21, lower metal layer 22, lower metal layer 23, pin layer 24, pinned layer 25, tunnel barrier layer 26, free layer 27, and upper metal layer 28 are sequentially laminated on the wafer 101 (FIGS. 6A and 6B). In this event, the lower electrode 21 is formed, for example, by a plating method, while the other layers are formed, for example, by a sputtering method. Subsequently, the substrate in this state is once left in the atmosphere. In this event, an oxide film (not shown) is formed on the top face of the upper metal layer 28 (FIGS. 6A and 6B).

Next, the lower metal layer 23, pin layer 24, pinned layer 25, tunnel barrier layer 26, free layer 27, upper metal layer 28, and the oxide film on the upper metal layer 28 are partially removed by first ion milling using a resist mask (not shown) for first lift-off for patterning. Next, in a region removed by the first ion milling, an oxidizable layer 33' (this layer is hereinafter referred as the "deterioration reducing layer" for convenience of description because the layer acts to reduce the deterioration in the characteristics of the fabricated TMR device 2 due to annealing) is formed while leaving the resist mask for the first lift-off as it is (FIGS. 7A and 7B). It should be noted that in FIGS. 7A and 7B, the resist mask for the first lift-off is omitted in the illustration.

From the first ion milling to this stage, the foregoing process is performed within the same vacuum chamber, so that the substrate 101 will never be placed in the atmosphere.

In the second embodiment, the deterioration reducing layer 33' is formed of a single-layer film made of a metal or a semiconductor. The deterioration reducing layer 33' should be oxidized to be the insulating layer 33 in the magnetic head according to the first embodiment. Specifically, the deterioration reducing layer 33' may be formed of a single-layer film made of, for example, Al, Si, Ti, V, Cr, Mn, Fe, Ni, Co, Cu, Zn, Zr, Nb, Mo, Hf, Ta, or W.

Subsequently, the substrate 101 having the deterioration reducing layer 33' deposited thereon is placed in the atmosphere to naturally oxidize the deterioration reducing layer 33'. As a result, the deterioration reducing layer 33' is changed into an oxide layer which serves as the insulating layer 33.

Next, in the same vacuum chamber in which the insulating layer 34 is deposited, the resulting product is dry etched by sputter etching, ion beam etching, or the like for cleaning the surface thereof. In the second embodiment, the previously deposited deterioration reducing layer 33' is set to have a relatively large thickness in consideration of the conditions for this dry etching, such that the insulating layer 33 remains after the dry etching.

Next, the insulating layer 34 is formed on the insulating layer 33 with the resist mask for the first lift-off being left as it is, and the magnetic domain control layer 32 is further formed on the insulating layer 34. Subsequently, the resist mask for the first lift-off is removed to complete the lift-off for the layers 33, 34, 32 (FIGS. 8A and 8B).

Next, the lower metal layer 23, pin layer 24, pinned layer 25, tunnel barrier layer 26, free layer 27, upper metal layer 28, oxide film (not shown) on the upper metal layer 28 as mentioned above, insulating layers 33, 34, and magnetic domain control layer 32 are partially removed by second ion milling using a resist mask (not shown) for second lift-off for patterning while leaving a strip portion which has a necessary width (width in the Y-axis direction) with respect to the height direction of the TMR device 2 and extends in the Z-axis direction by a predetermined length. Subsequently, in a region removed by the second ion milling, an oxidizable layer 35' (this layer is hereinafter referred as the "deterioration reducing layer" as well for convenience of description because the layer also acts to reduce the deterioration in the characteristics of the fabricated TMR device 2 due to annealing) is formed while leaving the resist mask for the second lift-off as it is (FIGS. 9A and 9B). It should be noted that in FIGS. 9A and 9B, the resist mask for the second lift-off is omitted in the illustration.

From the second ion milling to this stage, the foregoing process is performed within the same vacuum chamber, so that the substrate 101 will never be placed in the atmosphere.

In the second embodiment, the deterioration reducing layer 35' is formed of a single-layer film made of a metal or a semiconductor. The deterioration reducing layer 35' should be oxidized to be the insulating layer 35 in the magnetic head according to the first embodiment. Specifically, the deterioration reducing layer 35' may be formed of a single-layer film made of, for example, Al, Si, Ti, V, Cr, Mn, Fe, Ni, Co, Cu, Zn, Zr, Nb, Mo, Hf, Ta, or W.

Subsequently, the substrate 101 having the deterioration reducing layer 35' deposited thereon is placed in the atmosphere to naturally oxidize the deterioration reducing layer 35'. As a result, the deterioration reducing layer 35' is changed into an oxide layer which serves as the insulating layer 35.

Next, in the same vacuum chamber in which the insulating layer 30 is deposited, the resulting product is dry etched by sputter etching, ion beam etching, or the like for cleaning the surface thereof. In the second embodiment, the previously deposited deterioration reducing layer 35' is set to have a relatively large thickness in consideration of the conditions for this dry etching, such that the insulating layer 35 remains after the dry etching.

Next, the insulating layer 30 is formed on the insulating layer 35 with the resist mask for the second lift-off being left as it is. Subsequently, the resist mask for the second lift-off is removed to complete the lift-off for the layers 35, 30 (FIGS. 10A and 10B).

Subsequently, in the same vacuum chamber in which the upper metal layer 29 is formed, the resulting product is dry etched by sputter etching, ion beam etching, or the like to remove the oxide film formed on the top face of the upper metal layer 28.

Figure 11A:
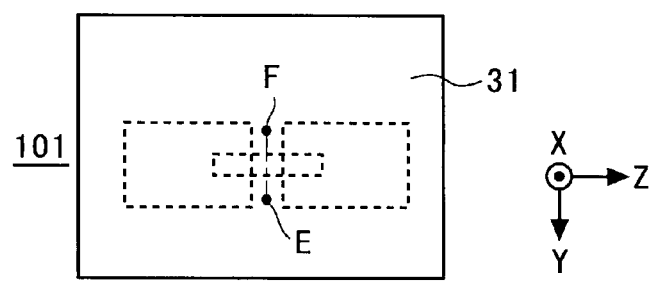
FIGS. 11A and 11B are diagrams schematically illustrating a further step which makes up the magnetic head manufacturing method according to the second embodiment of the present invention.
Figure 11B:
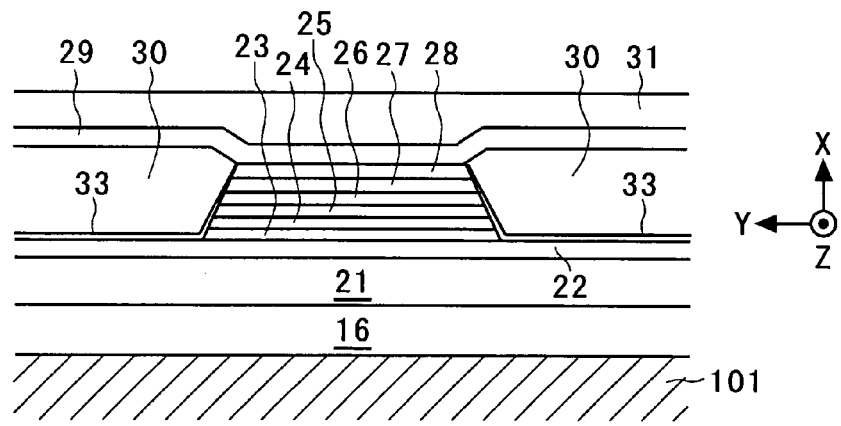

Next, the upper metal layer 29 is formed by a sputtering method or the like, and the upper electrode 31 is formed by a plating method or the like (FIGS. 11A and 11B).

Finally, the gap layer 38, coil layer 37, insulating layer 39, upper magnetic layer 36, and protection layer 40 are formed, and the electrodes 5a-5d are formed. Also, the resulting product is annealed for curing the insulating layer (thermosetting photoresist) 39. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, a protection film 4 is formed on the surface of the ABS side, and rails 11, 12 are formed by etching or the like. Finally, the bar is cut by machining into individual magnetic heads. In this manner, the magnetic heads are completed in accordance with the first embodiment.

It has been confirmed by an experiment, later described, that the magnetic head according to the first embodiment manufactured by the manufacturing method according to the second embodiment can reduce the deterioration in the characteristics of the TMR device 2 (increased resistance and reduced MR ratio) due to the annealing.

It is thought that the foregoing benefit results from the deterioration reducing layers 33', 35' which have the nature of absorbing and trapping oxygen, and the like.

Specifically, oxygen sticking on the end faces of the layers 23-28, exposed by the first ion milling, are trapped by the deterioration reducing layer 33'. Also, oxygen sticking on the end faces of the layers 23-28, exposed by the second ion milling, are trapped by the deterioration reducing layer 35'. It is therefore thought that it is possible to reduce the deterioration in the characteristics of the TMR device 2 (increased resistance and reduced MR ratio) due to the annealing.

In the present invention, the manufacturing method according to the second embodiment may be modified as described below. The modifications described below can be combined as appropriate for application to the manufacturing method according to the second embodiment.

First, the deterioration reducing layer 33' may be formed of a composite-layer film made of a metal and/or a semiconductor. In this event, each of layers which make up the composite-layer film may be made, for example, of Al, Si, Ti, V, Cr, Mn, Fe, Ni, Co, Cu, Zn, Zr, Nb, Mo, Hf, Ta, or W. This can be applied to the deterioration reducing layer 35' as well.

Second, the dry etching for cleaning the surface may be omitted before the deposition of the insulating layer 34. Similarly, the dry etching for cleaning the surface may be omitted before the deposition of the insulating layer 30.

Third, the oxidization of the deterioration reducing layer 33' is not limited to the natural oxidization, but the deterioration reducing layer 33' may be forcedly oxidized, for example, by plasma oxidization, radical oxidization, ion beam oxidization, exposure to ozone, and the like. Alternatively, for example, the substrate 101 may be placed in the atmosphere after the first ion milling and before the deposition of the deterioration reducing layer 33' to adsorb moisture and oxygen molecules in the air onto the end faces of the layers 23-28. Then, the deterioration reducing layer 33' may be deposited in this state such that oxygen and the like adsorbed on the end faces are trapped into the deterioration reducing layer 33', thereby oxidizing the deterioration reducing layer 33'. These aspects can be applied to the oxidization of the deterioration reducing layer 35' as well.

Fourth, one of the deterioration reducing layers 33', 35' may not be formed. Though both are preferably formed as in the second embodiment, either the deterioration reducing layer 33' or 35' may be formed to provide the advantage of reducing the deterioration in the characteristics of the TMR device 2 due to annealing.

Fifth, the substrate 101 may be placed in the atmosphere after the first ion milling and before the deposition of the deterioration reducing layer 33'. Similarly, the substrate 101 may be placed in the atmosphere after the second ion milling and before the deposition of the deterioration reducing layer 35'.

Next, description will be made on a method of manufacturing a magnetic head according to a third embodiment of the present invention.

The third embodiment is identical to the second embodiment except for the wafer process. The wafer process in the third embodiment differs from the wafer process in the second embodiment in that the deterioration reducing layer 33' is deposited in a relatively small thickness so that the insulating layer 33 is removed by the dry etching for cleaning the surface before the deposition of the insulating layer 34, and that the deterioration reducing layer 35' is deposited in a relatively small thickness so that the insulating layer 35 is removed by the dry etching for cleaning the surface before the deposition of the insulating layer 30.

Therefore, the steps themselves are the same both in the third embodiment and the second embodiment. However, the third embodiment differs from the second embodiment in the process diagram and the structure of the manufactured magnetic head resulting from the foregoing differences.

In the third embodiment, the wafer process is also performed firstly. Specifically, a wafer 101 made of Al2O3-TiC, SiC or the like is provided for making a base 15. Using the thin film forming technology and the like, the aforementioned layers are formed in a large number of magnetic head forming regions in matrix on the wafer 101 to provide the aforementioned structure.

Figure 13A:
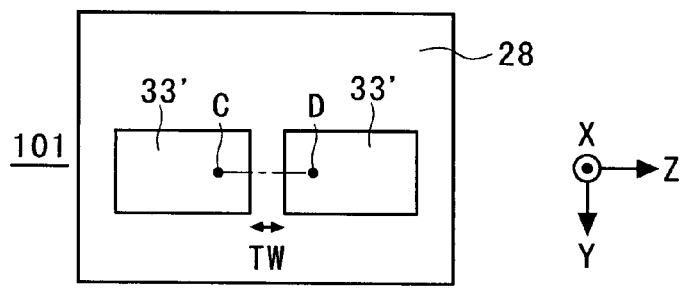
FIGS. 13A and 13B are diagrams schematically illustrating a further step which makes up the magnetic head manufacturing method according to the third embodiment of the present invention.
Figure 13B:
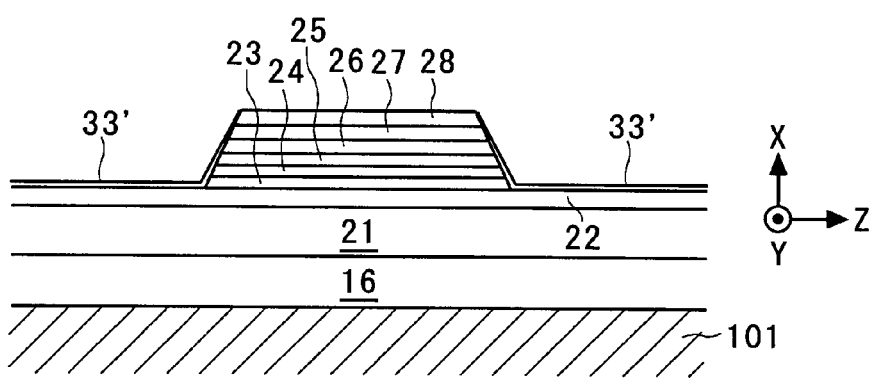
Figure 14A:
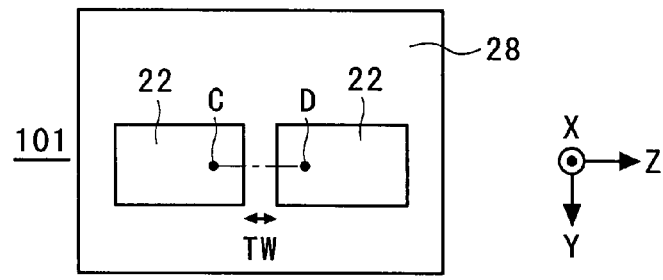
FIGS. 14A and 14B are diagrams schematically illustrating a further step which makes up the magnetic head manufacturing method according to the third embodiment of the present invention.
Figure 14B:
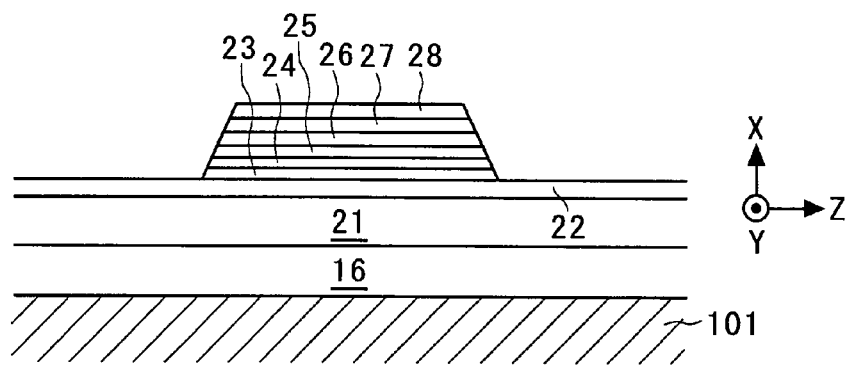
Figure 15A:
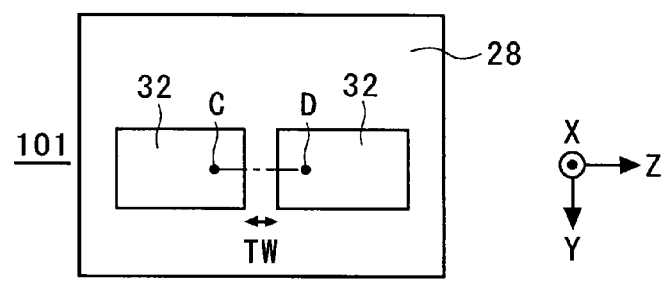
FIGS. 15A and 15B are diagrams schematically illustrating a further step which makes up the magnetic head manufacturing method according to the third embodiment of the present invention.
Figure 15B:
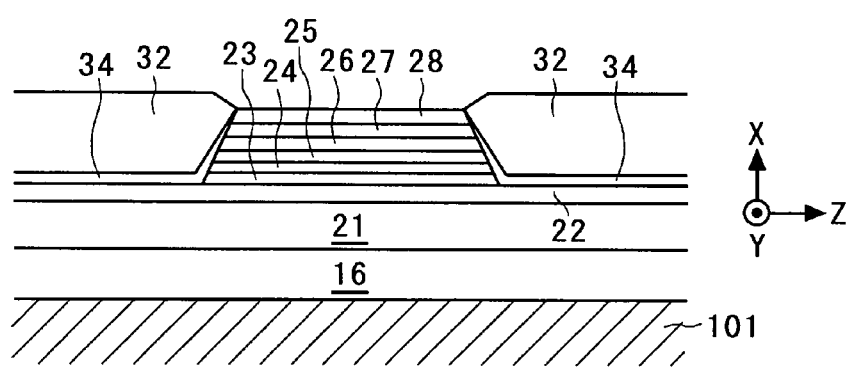
Figure 16A:
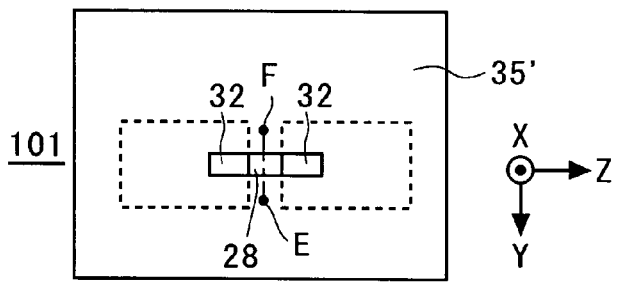
FIGS. 16A and 16B are diagrams schematically illustrating a further step which makes up the magnetic head manufacturing method according to the third embodiment of the present invention.
Figure 16B:
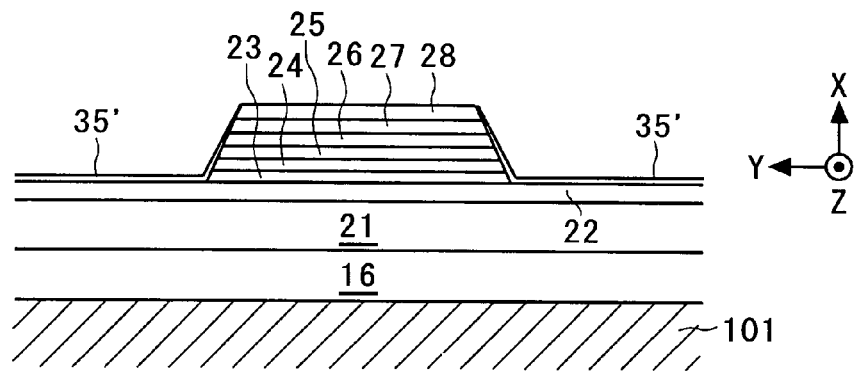
Figure 17A:
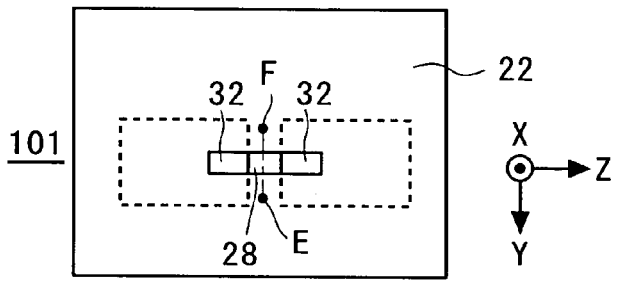
FIGS. 17A and 17B are diagrams schematically illustrating a further step which makes up the magnetic head manufacturing method according to the third embodiment of the present invention.
Figure 17B:
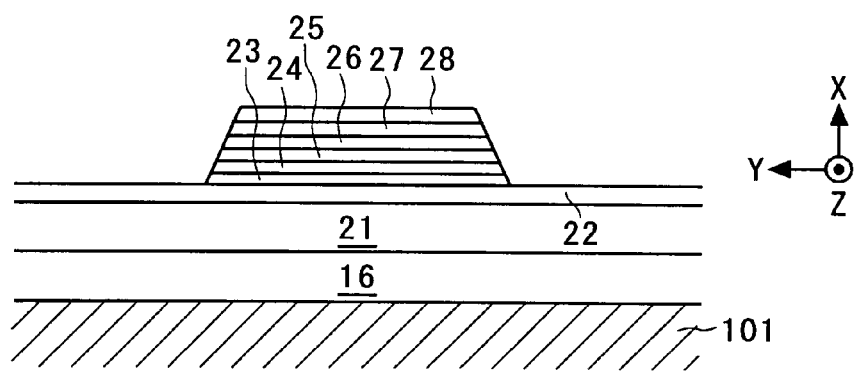
Figure 18A:
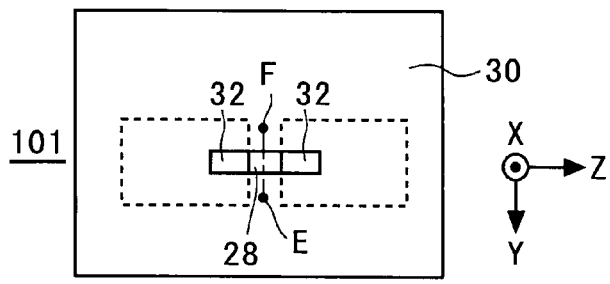
FIGS. 18A and 18B are diagrams schematically illustrating a further step which makes up the magnetic head manufacturing method according to the third embodiment of the present invention.
Figure 18B:
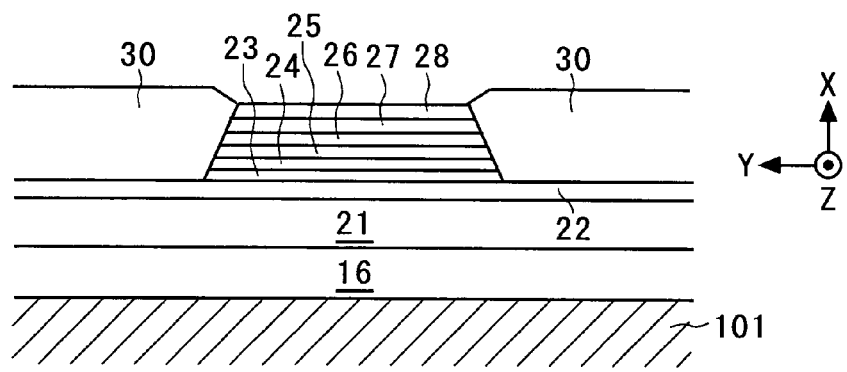

The outline of the wafer process will be described with reference to FIGS. 12 to 19. FIGS. 12 to 19 are diagrams schematically illustrating respective steps which make up the wafer process, wherein FIGS. 12A, 13A, 14A, 15A, 16A, 17A, 18A and 19A are general plan views, respectively; FIG. 12B is a general cross-sectional view taken along a line C-D in FIG. 12A; FIG. 13B is a general cross-sectional view taken along a line C-D in FIG. 13A; FIG. 14B is a general cross-sectional view taken along a line C-D in FIG. 14A; FIG. 15B is a general cross-sectional view taken along a line C-D in FIG. 15A; FIG. 16B is a general cross-sectional view taken along a line E-F in FIG. 16A; FIG. 17B is a general cross-sectional view taken along a line E-F in FIG. 17A; FIG. 18B is a general cross-sectional view taken along a line E-F in FIG. 18A; and FIG. 19B is a general cross-sectional view taken along a line E-F in FIG. 19A. In FIGS. 12 to 19, elements identical or corresponding to those in FIGS. 1 to 11 are designated by the same reference numerals. In FIGS. 13A, 14A and 15A, TW indicates the width of a track defined by the TMR device 2.

Figure 12A:
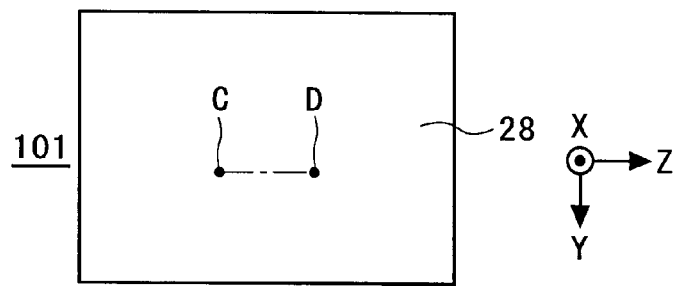
FIGS. 12A and 12B are diagrams schematically illustrating a step which makes up a magnetic head manufacturing method according to a third embodiment of the present invention.
Figure 12B:
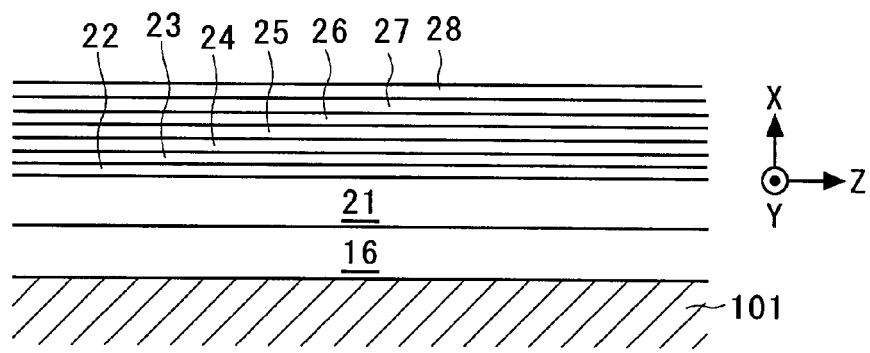

First, in the wafer process, the underlying layer 16, lower electrode 21, lower metal layer 22, lower metal layer 23, pin layer 24, pinned layer 25, tunnel barrier layer 26, free layer 27, and upper metal layer 28 are sequentially laminated on the wafer 101 (FIGS. 12A and 12B). In this event, the lower electrode 21 is formed, for example, by a plating method, while the other layers are formed, for example, by a sputtering method. Subsequently, the substrate in this state is once left in the atmosphere. In this event, an oxide film (not shown) is formed on the top face of the upper metal layer 28 (FIGS. 12A and 12B).

Next, the lower metal layer 23, pin layer 24, pinned layer 25, tunnel barrier layer 26, free layer 27, upper metal layer 28, and the oxide film on the upper metal layer 28 are partially removed by first ion milling using a resist mask (not shown) for first lift-off for patterning. Next, in a region removed by the first ion milling, a deterioration reducing layer 33' is formed while leaving the resist mask for the first lift-off as it is (FIGS. 13A and 13B). It should be noted that in FIGS. 13A and 13B, the resist mask for the first lift-off is omitted in the illustration.

From the first ion milling to this stage, the foregoing process is performed within the same vacuum chamber, so that the substrate 101 will never be placed in the atmosphere.

Subsequently, the substrate 101 having the deterioration reducing layer 33' deposited thereon is placed in the atmosphere to naturally oxidize the deterioration reducing layer 33'. As a result, the deterioration reducing layer 33' is changed into an oxide layer which serves as the insulating layer 33.

Next, in the same vacuum chamber in which the insulating layer 34 is deposited, the resulting product is dry etched by sputter etching, ion beam etching, or the like for cleaning the surface thereof. In the third embodiment, the previously deposited deterioration reducing layer 33' is set to have a relatively small thickness in consideration of the conditions for this dry etching, such that the insulating layer 33 is removed after the dry etching (FIGS. 14A and 14B). Therefore, in the third embodiment, this dry etching additionally acts as the step of removing the deterioration reducing layer 33' (strictly speaking, the insulating layer 33 resulting from the oxidization of the deterioration reducing layer 33'). It should be noted that in FIGS. 14A and 14B, the resist mask for the first lift-off is omitted in the illustration.

Next, the insulating layer 34 is formed in the region removed by the first ion milling, with the resist mask for the first lift-off being left as it is, and the magnetic domain control layer 32 is further formed on the insulating layer 34. Subsequently, the resist mask for the first lift-off is removed to complete the lift-off for the layers 34, 32 (FIGS. 15A and 15B).

Next, the lower metal layer 23, pin layer 24, pinned layer 25, tunnel barrier layer 26, free layer 27, upper metal layer 28, oxide film (not shown) on the upper metal layer 28 as mentioned above (not shown), insulating layer 34, and magnetic domain control layer 32 are partially removed by second ion milling using a resist mask (not shown) for second lift-off for patterning while leaving a strip portion which has a necessary width (width in the Y-axis direction) with respect to the height direction of the TMR device 2 and extends in the Z-axis direction by a predetermined length. Subsequently, in a region removed by the second ion milling, a deterioration reducing layer 35' is formed while leaving the resist mask for the second lift-off as it is (FIGS. 16A and 16B). It should be noted that in FIGS. 16A and 16B, the resist mask for the second lift-off is omitted in the illustration.

From the second ion milling to this stage, the foregoing process is performed within the same vacuum chamber, so that the substrate 101 will never be placed in the atmosphere.

Subsequently, the substrate 101 having the deterioration reducing layer 35' deposited thereon is placed in the atmosphere to naturally oxidize the deterioration reducing layer 35'. As a result, the deterioration reducing layer 35' is changed into an oxide layer which serves as the insulating layer 35.

Next, in the same vacuum chamber in which the insulating layer 30 is deposited, the resulting product is dry etched by sputter etching, ion beam etching, or the like for cleaning the surface thereof. In the third embodiment, the previously deposited deterioration reducing layer 35' is set to have a relatively small thickness in consideration of the conditions for this dry etching, such that the insulating layer 35 is removed after the dry etching (FIGS. 17A and 17B). Therefore, in the third embodiment, this dry etching additionally acts as the step of removing the deterioration reducing layer 35' (strictly speaking, the insulating layer 35 resulting from the oxidization of the deterioration reducing layer 35'). It should be noted that in FIGS. 17A and 177B, the resist mask for the first lift-off is omitted in the illustration.

Next, the insulating layer 30 is formed in the region removed by the second ion milling with the resist mask for the second lift-off being left as it is. Subsequently, the resist mask for the second lift-off is removed to complete the lift-off for the layer 30 (FIGS. 18A and 19B).

Subsequently, in the same vacuum chamber in which the upper metal layer 29 is formed, the resulting product is dry etched by sputter etching, ion beam etching, or the like to remove the oxide film formed on the top of the upper metal layer 28.

Figure 19A:
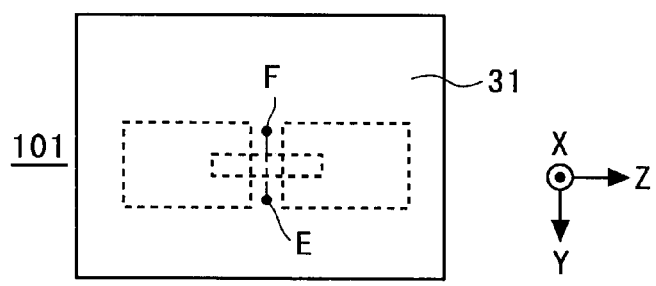
FIGS. 19A and 19B are diagrams schematically illustrating a further step which makes up the magnetic head manufacturing method according to the third embodiment of the present invention.
Figure 19B:
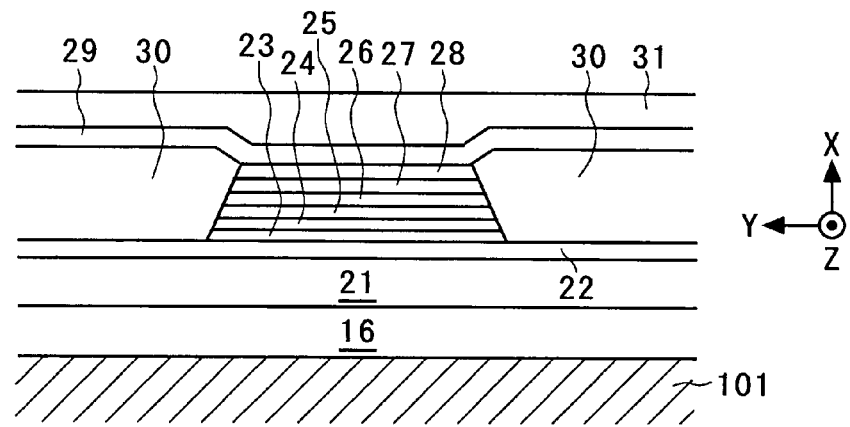

Next, the upper metal layer 29 is formed by a sputtering method or the like, and the upper electrode 31 is formed by a plating method or the like (FIGS. 19A and 19B).

Finally, the gap layer 38, coil layer 37, insulating layer 39, upper magnetic layer 36, and protection layer 40 are formed, and the electrodes 5a-5d are formed. Also, the resulting product is annealed for curing the insulating layer (thermosetting photoresist) 39. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, a protection film 4 is formed on the surface of the ABS side, and rails 11, 12 are formed by etching or the like. Finally, the bar is cut by machining into individual magnetic heads. In this manner, magnetic heads are completed.

Figure 20:
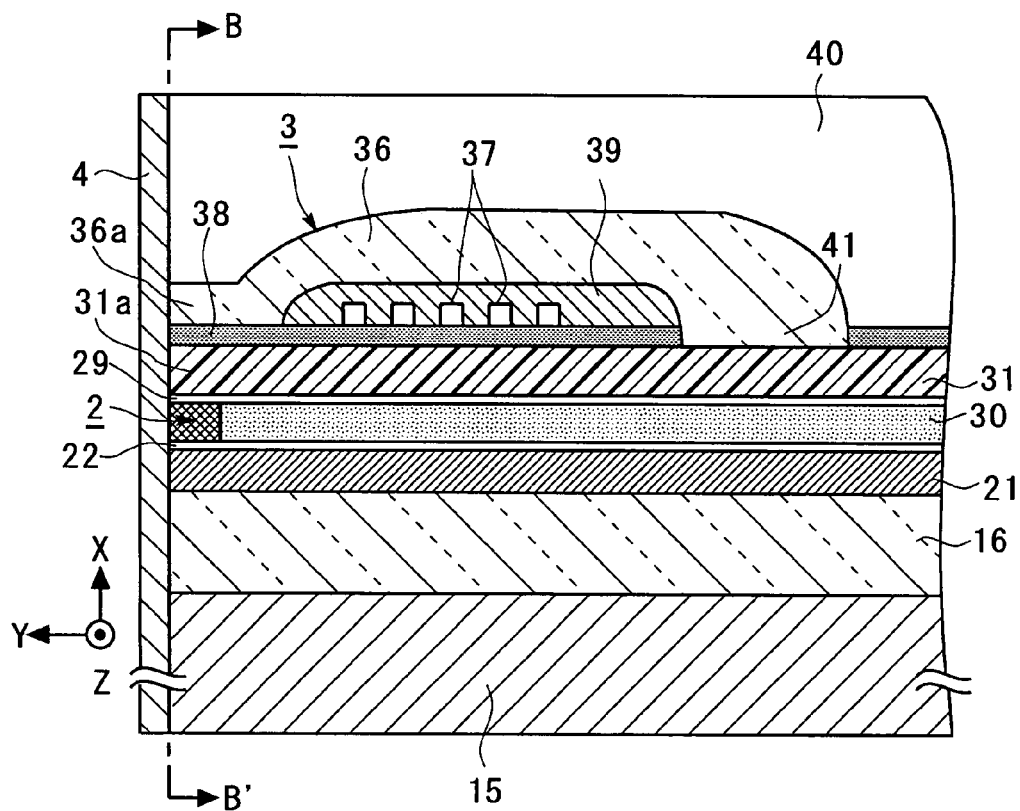
FIG. 20 is an enlarged cross-sectional view schematically illustrating a portion of a TMR device and an inductive magnetic transducing device in a magnetic head manufactured by the magnetic head manufacturing method according to the third embodiment of the present invention.
Figure 21:
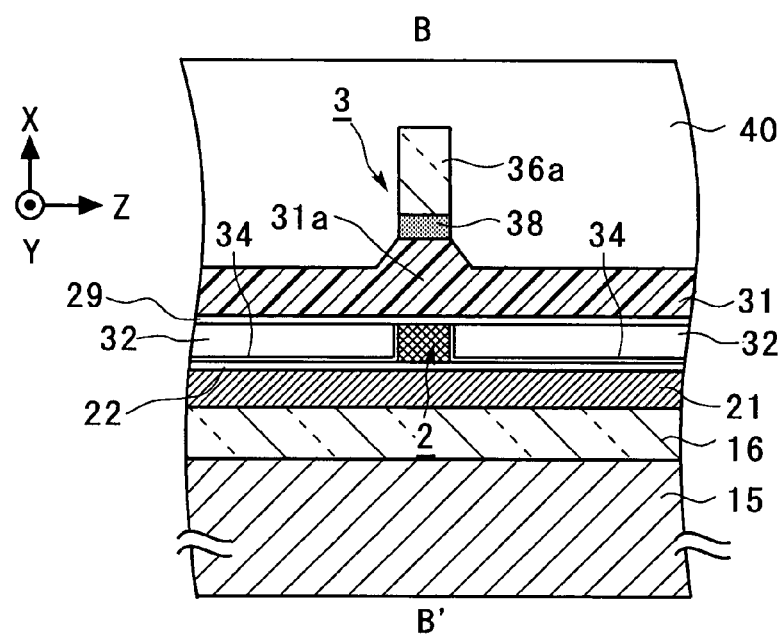
FIG. 21 is a general sectional view taken along a line B-B' indicated by arrows in FIG. 20.
Figure 22:
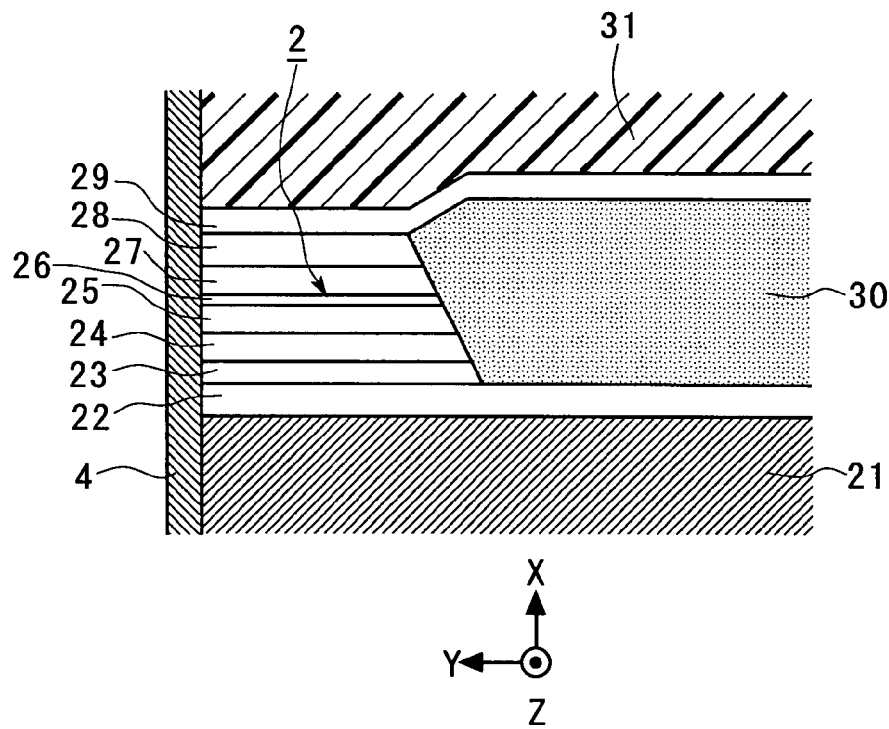
FIG. 22 is a further enlarged view around the TMR device in FIG. 20.
Figure 23:
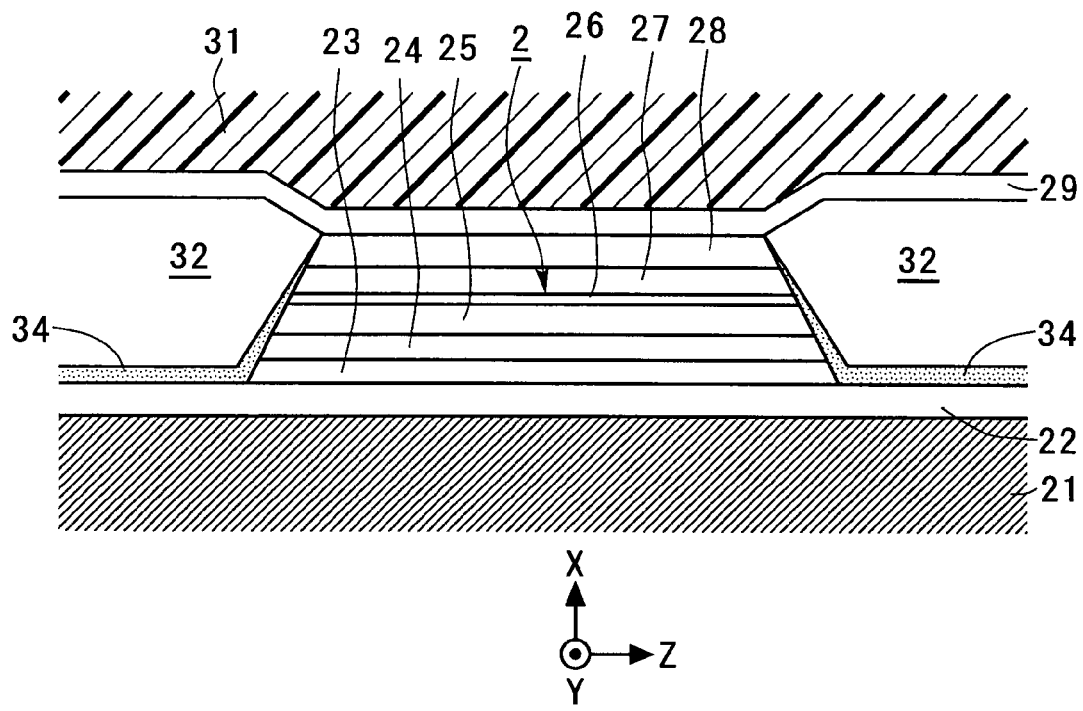
FIG. 23 is a further enlarged view around the TMR device in FIG. 21.

The magnetic head manufactured by the manufacturing method according to the third embodiment is illustrated in FIGS. 20 to 23. FIG. 20 is an enlarged cross-sectional view schematically illustrating a portion of the TMR device 2 and inductive magnetic transducing device 3 in the magnetic head manufactured by the manufacturing method according to the third embodiment of the present invention. FIG. 21 is a general sectional view taken along a line B-B' indicated by arrows in FIG. 20. FIG. 22 is a further enlarged view around the TMR device 2 in FIG. 20. FIG. 23 is a further enlarged view around the TMR device 2 in FIG. 21. FIGS. 20 to 23 correspond to FIGS. 2 to 5, respectively.

It can be understood from a comparison of FIGS. 20 to 23 with FIGS. 2 to 5 that the insulating layer 33 resulting from the oxidization of the deterioration reducing layer 33' and the insulating layer 35 resulting from the oxidization of the deterioration reducing layer 35' in FIGS. 2 to 5 are removed in the magnetic head manufactured by the manufacturing method according to the third embodiment.

It has been confirmed in an experiment, later described, that the magnetic head illustrated in FIGS. 2 to 5, manufactured by the manufacturing method according to the third embodiment, can reduce the deterioration in the characteristics of the TMR device 2 (increased resistance and reduced MR ratio) due to annealing.

It is thought that the foregoing benefit results from the deterioration reducing layers 33', 35' which have the nature of absorbing and trapping oxygen.

Specifically, oxygen sticking on the end faces of the layers 23-28, exposed by the first ion milling, are trapped by the deterioration reducing layer 33', and removed together with the deterioration reducing layer 33'. Also, oxygen sticking on the end faces of the layers 23-28, exposed by the second ion milling, are trapped by the deterioration reducing layer 35', and removed together with the deterioration reducing layer 35'. It is therefore thought that it is possible to reduce the deterioration in the characteristics of the TMR device 2 (increased resistance and reduced MR ratio) due to the annealing.

In the present invention, the manufacturing method according to the third embodiment may be modified as described below. Also, similar modifications made to the manufacturing method according to the second embodiment may be applied to the third embodiment. Further, these modifications can be combined as appropriate for application to the manufacturing method according to the third embodiment.

First, the deterioration reducing layers 33', 35' may not be oxidized.

Second, only one of the deterioration reducing layers 33', 35' may be deposited in a relatively large thickness, such that the insulating layer resulting from the oxidization of the deterioration reducing layer deposited in a relatively large thickness remains.

Next, description will be made on a method of manufacturing a magnetic head according to a fourth embodiment of the present invention.

The fourth embodiment differs from the aforementioned third embodiment only in the following aspects, and the magnetic head manufactured by the manufacturing method according to the fourth embodiment is identical to the magnetic head manufactured by the manufacturing method according to the third embodiment from a viewpoint of structure.

As described above, oxidizable layers are used for the deterioration reducing layers 33', 35' in the third embodiment. In the fourth embodiment, on the other hand, substantially oxidation-free layers made of a metal or semiconductor are used instead of the oxidizable layers for the deterioration reducing layers 33', 35'. Specifically, each of the deterioration reducing layers 33', 35' may be formed of a single-layer film or a composite-layer film made of one or more materials, for example, selected from the group consisting of Ru, Rh, Pd, Ag, Re, Os, Ir, Pt, and Au.

The fourth embodiment is similar to the third embodiment in that the deterioration reducing layer 33' is deposited in a relatively small thickness, such that the insulating layer 33 is removed after the dry etching for cleaning the surface before the deposition of the insulating layer 34, and that the deterioration reducing layer 35' is deposited in a relatively small thickness, such that the insulating layer 35 is removed after the dry etching for cleaning the surface before the deposition of the insulating layer 30.

While the fourth embodiment is similar to the third embodiment in that the substrate 101 is placed in the atmosphere after the deposition of the deterioration reducing layer 33', the deterioration reducing layer 33' is not oxidized in the method of the fourth embodiment. Subsequently, the deterioration reducing layer 33' is removed by dry etching for cleaning the surface, as in the third embodiment, such as sputter etching, ion beam etching or the like, in the same vacuum chamber in which the insulating layer 34 is deposited.

Also, while the fourth embodiment is similar to the third embodiment in that the substrate 101 is placed in the atmosphere after the deposition of the deterioration reducing layer 35', the deterioration reducing layer 35' is not oxidized in the fourth embodiment. Subsequently, the deterioration reducing layer 35' is removed by dry etching for cleaning the surface, as in the third embodiment, such as sputter etching, ion beam etching or the like, in the same vacuum chamber in which the insulating layer 30 is deposited.

Except for the aspects mentioned above, the fourth embodiment is identical to the third embodiment.

As mentioned above, unlike the third embodiment, the deterioration reducing layers 33', 35' in the fourth embodiment are formed of a material which is free from oxidization. For this reason, the deterioration reducing layers 33', 35' in the fourth embodiment do not have the nature of absorbing and trapping oxygen. Instead, the deterioration reducing layers 33', 35' in the fourth embodiment do have a barrier-like nature to oxygen and the like. Therefore, according to the fourth embodiment, even if the substrate 101 is placed in the atmosphere after the deposition of the deterioration reducing layer 33', the end faces of the layers 23-28, exposed by the first ion milling, are protected by the barrier-like nature of the deterioration reducing layer 33', so that oxygen molecules, moisture and the like in the air are prevented from sticking onto the end faces of the layers 23-28. Also, according to the fourth embodiment, even if the substrate 101 is placed in the atmosphere after the deposition of the deterioration reducing layer 35', the end faces of the layers 23-28, exposed by the second ion milling, are protected by the barrier-like nature of the deterioration reducing layer 35', so that oxygen molecules, moisture, and the like in the air are prevented from sticking onto the end faces of the layers 23-28.

Consequently, the magnetic head manufactured by the manufacturing method according to the fourth embodiment can also reduce the deterioration in the characteristics of the TMR device 2 due to the annealing. Nevertheless, the deterioration reducing layers 33', 35' are preferably formed of oxidizable layers as in the third embodiment because the resulting magnetic head can further reduce the deterioration in the characteristics of the TMR device 2 due to annealing.

In the present invention, the manufacturing method according to the fourth embodiment may be modified in the following manner. Specifically, one of the deterioration reducing layers 33', 35' may be formed of an oxidizable layer. Alternatively, one of the deterioration reducing layers 33', 35' may be formed of a composite-layer film composed of an oxidizable layer and an oxidation-free layer, while the other may be formed of an oxidizable layer or an oxidization-free layer.

Now, a magnetic disk apparatus according to a fifth embodiment of the present invention will be described with reference to FIG. 24.

Figure 24:
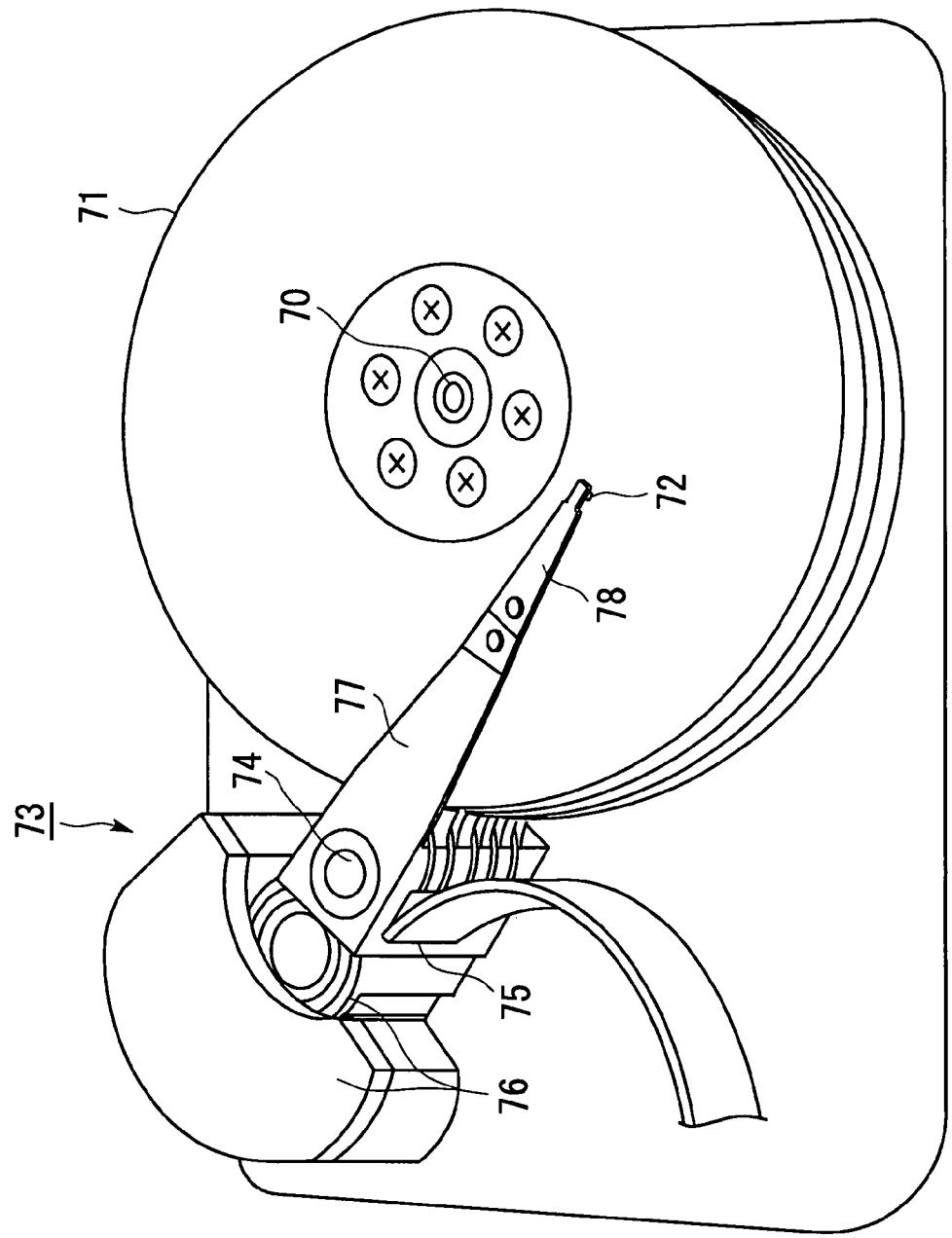
FIG. 24 is a perspective view generally illustrating the configuration of a main portion of a magnetic disk apparatus according to a fifth embodiment of the present invention.

FIG. 24 is a perspective view generally illustrating the configuration of a main portion of a magnetic disk apparatus according to a fifth embodiment of the present invention.

The magnetic disk apparatus according to the fifth embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the fifth embodiment, the magnetic disk apparatus comprises either of the magnetic heads according to the first embodiment, or the magnetic head manufactured by the manufacturing method according to the second or third embodiment. Therefore, the magnetic disk apparatus according to the fifth embodiment can advantageously increase the recording density.

A sample magnetic head 1 was manufactured in the same steps as those in the manufacturing method according to the second and third embodiments except that the deterioration reducing layers 33', 35' were not formed. Also, sample magnetic heads 2-10 were manufactured in the same steps as those in the manufacturing method according to the second and third embodiments. In this event, when the sample 1 was manufactured, the deterioration reducing layers 33', 35' were not formed. On the other hand, when the samples 2-10 were manufactured, the deterioration reducing layers 33', 35' were changed in material and film thickness as shown in Table 2 below, with the remaining conditions being identical for the samples 1-10. The compositions of the main layers in the samples 1-10 are as shown in Table 1 below.

TABLE 1

| Name of Layer and Reference Numeral in Drawings | Composition and Thickness of Layer (When composed of two layers or more, a layer more to the left is positioned lower (near the substrate)) |
|---|---|
| Upper Electrode 31 (serving also as Upper Magnetic Shield) | NiFe(2□m) |
| Upper Metal Layer 29 | Ta(5 nm) |
| Insulating Layer 30 | $Al_2O_3$(60 nm) |
| Magnetic Domain Control Layer 32 | CrTi(5 nm)/CoCrPt(30 nm)/Ta (5 nm) |
| Insulating Layer 34 | $Al_2O_3$(5 nm) |
| Deterioration Reducing Layers 33'. 35' | As shown in Table 2 |
| Upper Metal Layer 28 (Cap Layer) | Ta(18 nm) |
| Free Layer 27 | CoFe(2 nm)/NiFe(3 nm) |
| Tunnel Barrier Layer 26 | $Al_2O_3$(0.6 nm) |
| Pinned Layer 25 | CoFe(2 nm)/Ru(0.8 nm)/CoFe (3 nm) |
| Pin layer 24 | PtMn(15 nm) |
| Lower Metal Layer 23 | NiFe(2 nm) |
| Lower Metal Layer 22 | Ta(5 nm) |
| Lower Electrode 21 (serving also as Lower Magnetic Shield) | NiFe(2□m) |

TABLE 2

| | Material and Thickness of Deterioration Reducing Layers 33', 35' |
|---|---|
| Sample 1 | non |
| Sample 2 | Ta(0.5 nm) |
| Sample 3 | Ta(1.0 nm) |
| Sample 4 | Ta(2.0 nm) |
| Sample 5 | Al(0.5 nm) |
| Sample 6 | Al(1.0 nm) |
| Sample 7 | Al(2.0 nm) |
| Sample 8 | Ti(0.5 nm) |
| Sample 9 | Ti(1.0 nm) |
| Sample 10 | Ti(2.0 nm) |

During the manufacturing of the samples 2-10, sputter etching was performed under the following conditions as the dry etching immediately before the deposition of the insulating layer 34 (i.e., the dry etching for the insulating layer 33 resulting from the oxidization of the deterioration reducing layer 33'), and the dry etching immediately before the deposition of the insulating layer 30 (i.e., the dry etching for the insulating layer 35 resulting from the oxidization of the deterioration reducing layer 35'). In the condition, the power was set to 150 W; the flow of Ar gas to 40 sccm; the Ar gas pressure to 7×10−2 Pa; and an etching time to 30 seconds.

From a comparison of the etching amount for the insulating layers 33, 35 of the respective samples 2-10 under the condition with the thicknesses of the insulating layers 33, 35, it is estimated that no insulating layers 33, 35 remain in the samples 2, 5, 8 which have the deterioration reducing layers 33', 35' of 0.5 nm thick, as illustrated in FIGS. 20 to 23; it is unknown whether or not the insulating layers 33, 35 remain in the samples 3, 5, 9 which have the deterioration reducing layers 33', 35' of 1,0 nm thick; and it is estimated that the insulating layers 33, 35 do remain in the samples 4, 7, 10 which have the deterioration reducing layers 33', 35' of 2.0 nm thick, as illustrated in FIGS. 2 to 5.

Also, during the manufacturing of the samples 1-10, the samples were annealed at 250° C. for two hours for curing the insulating layer (thermosetting photoresist) 39.

Then, the resistance and MR ratio of previously fabricated TMR devices 2 in the samples 1-10 were measured before and after the annealing, respectively. The result of the measurement is shown in Table 3 below.

TABLE 3

|  | Before Annealing | | After Annealing | | Shift | Shift |
|---|---|---|---|---|---|---|
|  | Resistance (Ω) | MR Ratio (%) | Resistance (Ω) | MR Ratio (%) | Ratio of Resistance (%) | Ratio of MR ratio (%) |
| Sample 1 | 14.2 | 19.4 | 21.3 | 17.6 | 49.8 | −9.5 |
| Sample 2 | 13.6 | 19.0 | 16.7 | 17.9 | 22.6 | −5.7 |
| Sample 3 | 13.6 | 19.0 | 14.7 | 18.2 | 7.7 | −4.1 |
| Sample 4 | 10.3 | 12.8 | 10.9 | 13.3 | 6.1 | 4.0 |
| Sample 5 | 13.8 | 18.8 | 18.1 | 17.5 | 31.1 | −6.9 |
| Sample 6 | 12.9 | 18.4 | 14.9 | 17.8 | 15.1 | −3.2 |
| Sample 7 | 13.5 | 18.1 | 13.7 | 17.7 | 0.9 | −2.4 |
| Sample 8 | 14.1 | 19.3 | 19.4 | 17.9 | 37.7 | −7.3 |
| Sample 9 | 13.8 | 19.0 | 16.2 | 18.2 | 17.7 | −4.0 |
| Sample 10 | 13.7 | 19.2 | 15.1 | 18.8 | 10.2 | −2.3 |

Figure 25:
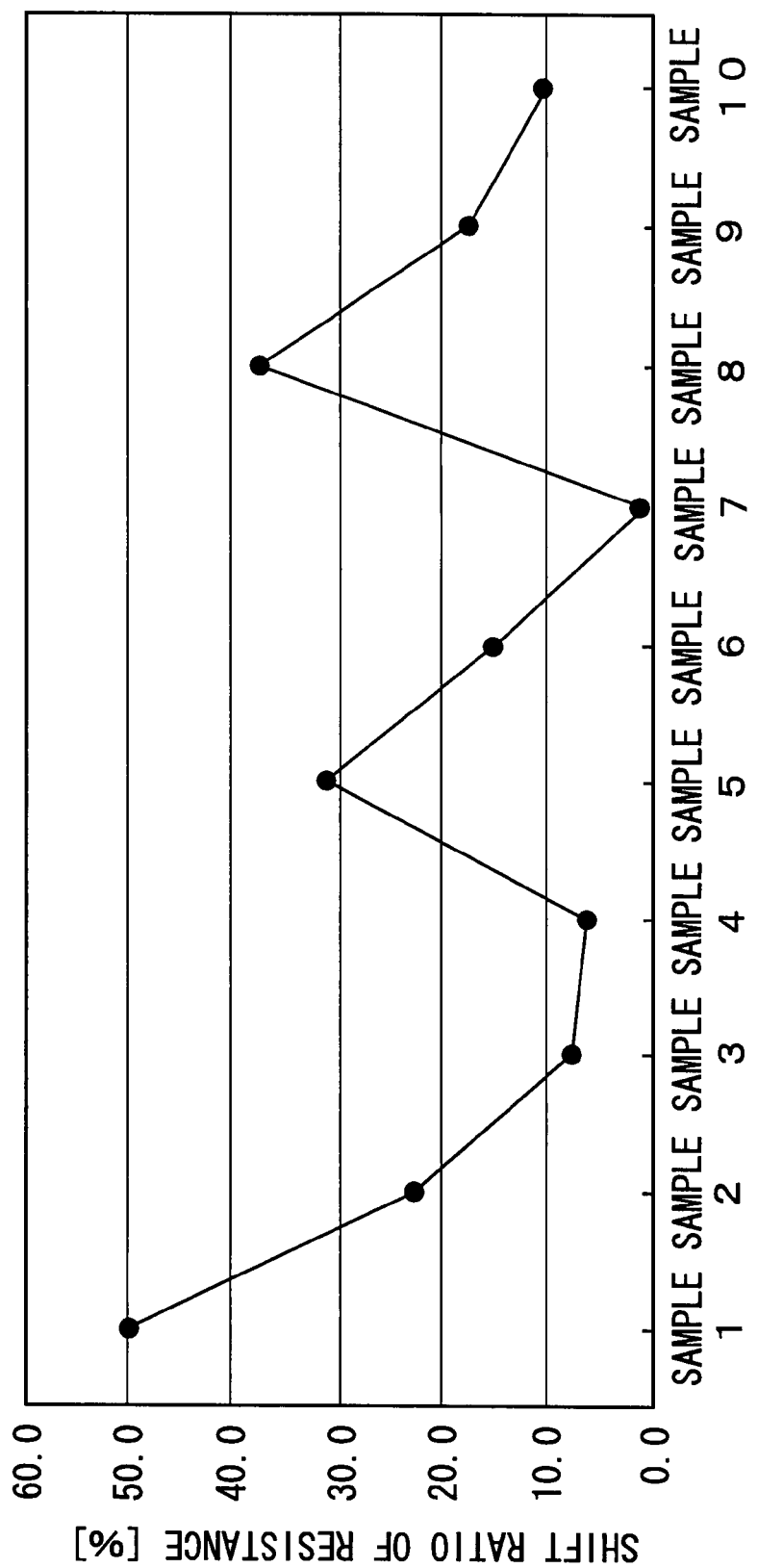
FIG. 25 is a graph showing a shift ratio of the resistance of respective samples.
Figure 26:
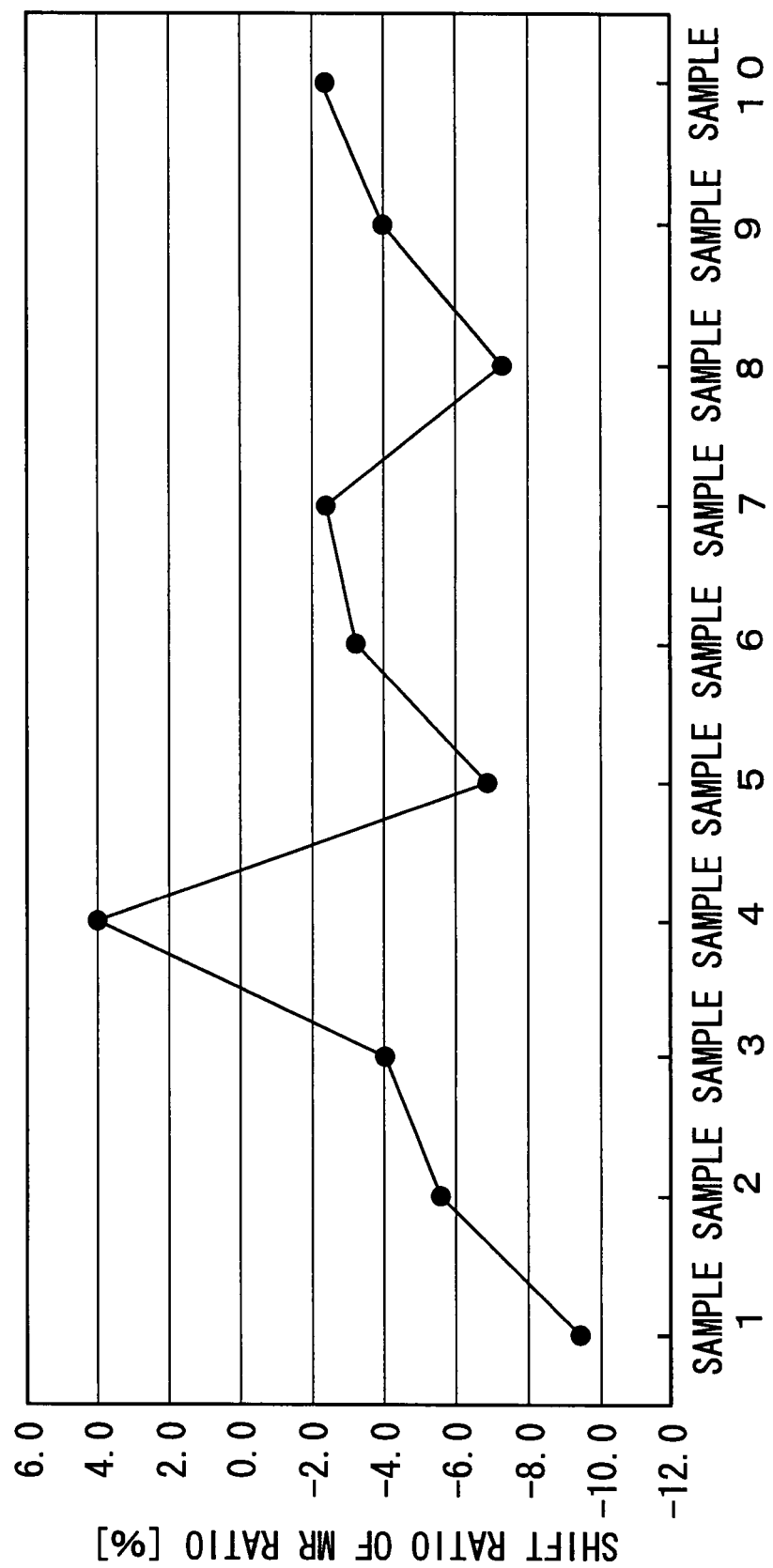
FIG. 26 is a graph showing a shift ratio of the MR ratio of respective samples.

For each of the samples 1-10, a shift ratio of the resistance and a shift ratio of the MR ratio were calculated from the measured resistances and MR ratios before and after the annealing. These shift ratios are also included in Table 3. In addition, FIG. 25 shows a graph representing the shift ratio of the resistances for the samples 1-10, and FIG. 26 shows a graph representing the shift ratio of the MR ratio for the samples 1-10. The shift ratio was calculated in accordance with the following equation:

Shift Ratio={(Value after Annealing−Value before Annealing)/Value before Annealing}×100[%]

As can be seen from Table 3 and FIGS. 25, 26, the samples 2-10, except for the sample 1 which does not include the deterioration reducing layers 33', 35', exhibit the shift ratio of the resistance and the shift ratio of the MR ratio, the absolute values of which are closer to zero, as compared with the sample 1. In other words, it is understood that the use of a Ta, Al or Ti layer of approximately 0.5 nm-2.0 nm thick as the deterioration reducing layers 33', 35' can limit an increase in the resistance of the TMR device 2 and a reduction in the MR ratio.

It should be understood that the thickness of an oxide film should vary depending on the type of material, so that the thickness is not limited in the range of 0.5 nm to 2.0 nm. For example, the thickness may be more than 2.0 nm if the deterioration reducing layers 33', 35' are formed of a metal which is deeply oxidized.

While several embodiments of the present invention and modifications thereto as well as examples have been described above, the present invention is not limited to those.

For example, while the foregoing embodiments have shown examples in which the present invention is applied to a TMR device, the present invention can be applied as well to a magneto-resistive device which has a CPP structure such as CPP-GMR.

Also, while the foregoing embodiments have shown examples in which the present invention is applied to a magnetic head that employs a magneto-resistive device, the present invention can be applied as well to a device having a structure in which an insulating layer is in contact with the periphery of a magneto-resistive layer, for example, MRAM, magnetic detector, and the like.

As described above, the present invention can provide a magneto-resistive device which can reduce the deterioration in the device characteristics due to annealing, and a method of manufacturing the same, as well as a magnetic head, a head suspension assembly, and a magnetic disk apparatus which use the magneto-resistive device.

What is claimed is:

1. A method of manufacturing a magneto-resistive device comprising the steps of:
   depositing constituent layers making up a magneto-resistive layer on a base;
   patterning one or more layers of said constituent layers;
   depositing an oxidizable layer having electric conductivity in a region in which said one or more layers of said constituent layers have been removed by the patterning;
   oxidizing said oxidizable layer to be changed into an oxide layer which serves as an insulating layer; and
   depositing an insulating layer on said oxide layer so that substantially all of a surface of the insulating layer on a side closer to the oxide layer contacts directly with the oxide layer.

2. A method of manufacturing a magneto-resistive device according to claim 1, wherein:
   said step of oxidizing includes the step of placing said base in the atmosphere to naturally oxidize said oxidizable layer.

3. A method of manufacturing a magneto-resistive device according to claim 1, further comprising the step of performing dry etching for cleaning the surface of said oxide layer immediately before said step of depositing said insulating layer.

4. A method of manufacturing a magneto-resistive device according to claim 3, wherein said step of performing dry etching includes the step of performing the dry etching in the same vacuum chamber in which said step of depositing said insulating layer is performed.

5. A method of manufacturing a magneto-resistive device according to claim 3, wherein said oxide layer substantially remains after said step of performing dry etching and after said step of depositing said insulating layer.

6. A method of manufacturing a magneto-resistive device according to claim 1, wherein said oxidizable layer is formed of a single-layer film or a composite-layer film made of one or more materials selected from a group consisting of Al, Si, Ti, V, Cr, Mn, Fe, Ni, Co, Cu, Zn, Zr, Nb, Mo, Hf, Ta, and W.

7. A method of manufacturing a magneto-resistive device according to claim 1, wherein said magneto-resistive device includes an effective region effectively involved in detection of magnetism in said magneto-resistive layer, said effective region being a region in which a current flows in a direction substantially perpendicular to the film surface in said magneto-resistive layer.

8. A method of manufacturing a magneto-resistive device according to claim 1, wherein said magneto-resistive layer includes a tunnel barrier layer formed on one surface side of a free layer, a pinned layer formed on one surface side of said tunnel barrier layer opposite to said free layer, and a pinning layer formed on one surface side of said pinned layer opposite to said tunnel barrier layer.

* * * * *